(12) United States Patent
Shiraishi

(10) Patent No.: US 7,609,428 B2
(45) Date of Patent: Oct. 27, 2009

(54) OPTICAL BEAM SCANNING DEVICE, OPTICAL BEAM SCANNING METHOD

(75) Inventor: Takashi Shiraishi, Kanagawa-ken (JP)

(73) Assignees: Kabushiki Kashia Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 335 days.

(21) Appl. No.: 11/755,120

(22) Filed: May 30, 2007

(65) Prior Publication Data

US 2008/0297872 A1 Dec. 4, 2008

(51) Int. Cl.
*G02B 26/08* (2006.01)

(52) U.S. Cl. ............................... 359/204.5; 359/207.7

(58) Field of Classification Search .............. 359/204.1, 359/205.1, 207.1, 207.7, 204.5, 216.1, 566, 359/568; 347/241, 243; 250/234–236
See application file for complete search history.

(56) References Cited

U.S. PATENT DOCUMENTS 6,215,574 B1 *  4/2001  Toyoda ..................... 359/207.1
6,965,465 B2 * 11/2005  Ishihara .................... 359/205.1

FOREIGN PATENT DOCUMENTS

| JP | 08-136839 | 5/1996 |
| JP | 2002-221681 | 8/2002 |
| JP | 2005-221870 | 8/2005 |
| JP | 2006-154701 | 6/2006 |
| JP | 2006-171117 | 6/2006 |

\* cited by examiner

*Primary Examiner*—Euncha P Cherry
(74) *Attorney, Agent, or Firm*—Turocy & Watson, LLP

(57) ABSTRACT

There is provided a technique in which in an optical beam scanning device, optical characteristics can be suitably corrected according to a change in environmental temperature. The optical beam scanning device is configured to shape a divergent light from a light source into a light flux having a specified sectional shape by a pre-deflection optical system and to guide the light flux, which is shaped by the pre-deflection optical system 7 and is deflected and scanned in a main scanning direction by a rotation deflector, to a photosensitive surface of each of plural photosensitive bodies by a post-deflection optical system A, the pre-deflection optical system 7 includes a first optical element which is an optical element having a negative power and in which a main light beam of the light flux guided in the pre-deflection optical system 7 passes along an optical axis of the optical element, and the post-deflection optical system A includes at least one second optical element which is an optical element including a diffraction grating formed on at least one of a light flux incident surface and a light flux outgoing surface and in which main light beams of light fluxes to be guided to the respective plural photosensitive bodies are incident on incident positions different from each other in a sub-scanning direction orthogonal to the main scanning direction.

20 Claims, 32 Drawing Sheets

FIG.10

$$x = \cfrac{cuy \times y^2 + cuz \times z^2}{1 + \sqrt{1 - ay \times cuy^2 \times y^2 - az \times cuz^2 \times z^2}} + \sum a_{lm} \times y^l \times z^m$$

LENS SURFACE SHAPE DEFINITION EXPRESSION

FIG.11

POLYGON MIRROR INSCRIBED CIRCLE DIAMETER    40.0

POLYGON MIRROR ROTATION CENTER POSITION    X  17.2    Y  10.1
(POSITION SEEN FROM POLYGON REFLECTING SURFACE LOCAL COORDINATE SYSTEM)

|  | RAY1 | RAY2 | RAY3 | RAY4 |
|---|---|---|---|---|
| FINITE LENS IMAGING POSITION | 414.8 | 403.5 | 405.9 | 415.2 |

| | SURFACE No. | CURVATURE MAIN SCANNING cuy | CURVATURE SUB-SCANNING cuz | TH COMMON | TH RAY1 | TH RAY2 | TH RAY3 | TH RAY4 | REFRACTIVE INDEX N | REMARKS |
|---|---|---|---|---|---|---|---|---|---|---|
| PRE-DEFLECTION OPTICAL SYSTEM | 1 | −0.0046 | 0.0159 | 3.0 | 33.3 | 33.3 | 33.3 | 33.3 | 1.503 | PLASTIC LENS |
|  | 2 | 0 | 0.03973 | 5.0 |  |  |  |  | 1.511 |  |
|  | 3 |  |  | −14.7 | −14.7 | −15.3 | −14.6 | −14.7 |  |  |
|  | 4 |  |  | 67.9 |  |  |  |  |  |  |
|  | 5 |  |  | 10.0 |  |  |  |  | 1.511 |  |
|  | 6 |  |  | 14.3 |  |  |  |  |  |  |
|  | 7 |  |  | 2.0 |  |  |  |  | 1.511 |  |
|  | 8 |  |  | 11.1 |  |  |  |  |  |  |
| POST-DEFLECTION OPTICAL SYSTEM | 9 |  |  | −6.8 |  |  |  |  |  | DEFLECTION SURFACE |
|  | 10 |  |  | −2.0 |  |  |  |  |  |  |
|  | 11 |  |  | −25.3 |  |  |  |  |  |  |
|  | 12 | 0.01681 | −0.0747 | −5.6 |  |  |  |  | −1.503 | PLASTIC LENS. CURVED SURFACE POLYNOMIAL COEFFICIENT:TABLE1 |
|  | 13 | 0.0213 | 0.05477 | −129.7 |  |  |  |  | −1.511 | PLASTIC LENS. CURVED SURFACE POLYNOMIAL COEFFICIENT:TABLE2 |
|  | 14 | 0.00097 | −0.0137 | −5.9 |  |  |  |  | −1.503 | PLASTIC LENS. CURVED SURFACE POLYNOMIAL COEFFICIENT:TABLE3 |
|  | 15 | 0.00241 | 0.00878 | −131.5 |  |  |  |  | −1.511 | PLASTIC LENS. CURVED SURFACE POLYNOMIAL COEFFICIENT:TABLE4 |
|  | 16 |  |  | −2.0 | 0.0 | 0.0 | −0.1 | −0.3 |  |  |
|  | 17 |  |  |  |  |  |  |  |  |  |
|  | 18 |  |  | −83.0 |  |  |  |  |  |  |

GLASS (BK7):1.511
PLASTIC LENS:1.503

REFRACTIVE INDEX, DISTANCE BETWEEN SURFACES AND SHAPE DATA AFTER REFLECTION HAVE THE FORM WITH "−".
LENS SURFACE SHAPE WITH CURVED POLYNOMIAL COEFFICIENT DATA IS INDICATED BY THE FOLLOWING EXPRESSION.
$x = (cuy*y^2 + cuz*z^2)/(1 + \sqrt{1 - ay*cuy^2*y^2 - az*cuz^2*z^2}) + \Sigma\, a_{ln}*y^l*z^m$  IN THIS EXAMPLE, $ay = 1$, $az = 1$
y DIRECTION: MAIN SCANNING DIRECTION, z DIRECTION: SUB-SCANNING DIRECTION, x DIRECTION: OPTICAL AXIS DIRECTION
(+ SIDE IN EACH LOCAL COORDINATE SYSTEM OF PRE-DEFLECTION OPTICAL SYSTEM, − SIDE IN EACH LOCAL COORDINATE SYSTEM OF POST-DEFLECTION OPTICAL SYSTEM)

FIG.12

PLASTIC LENS PARAXIAL POWER BEFORE DEFLECTION

| | PARAXIAL CURVATURE | | EACH SURFACE POWER | | EQUIVALENT INTERVAL | PARAXIAL POWER AS LENS | $\phi/\nu$ |
|---|---|---|---|---|---|---|---|
| | INCIDENT SURFACE | OUTGOING SURFACE | INCIDENT SURFACE | OUTGOING SURFACE | | | |
| MAIN SCANNING | -4.592E-03 | 0.000E+00 | -2.31E-03 | 0.00E+00 | 1.99538 | -0.00231806 | -1.38963E-05 |
| SUB-SCANNING | 1.590E-02 | 3.973E-02 | 8.01E-03 | -2.00E-02 | 1.99538 | -0.01167990 | -7.02082E-05 |

GLASS LENS PARAXIAL POWER BEFORE DEFLECTION

| | PARAXIAL CURVATURE | | EACH SURFACE POWER | | EQUIVALENT INTERVAL | PARAXIAL POWER AS LENS | $\phi/\nu$ |
|---|---|---|---|---|---|---|---|
| | INCIDENT SURFACE | OUTGOING SURFACE | INCIDENT SURFACE | OUTGOING SURFACE | | | |
| MAIN SCANNING | 0.000E+00 | 0.000E+00 | 0.00E+00 | 0.00E+00 | 3.30967 | 0 | 0 |
| SUB-SCANNING | 3.973E-02 | 0.000E+00 | 2.00E-02 | 0.00E+00 | 3.30967 | 0.02000457 | 0.000120248 | f1 PLASTIC LENS PARAXIAL POWER

| | PARAXIAL CURVATURE | | EACH SURFACE POWER | | EQUIVALENT INTERVAL | PARAXIAL POWER AS LENS | $\phi/\nu$ |
|---|---|---|---|---|---|---|---|
| | INCIDENT SURFACE | OUTGOING SURFACE | INCIDENT SURFACE | OUTGOING SURFACE | | | |
| MAIN SCANNING | -1.675E-02 | -2.111E-02 | -8.43E-03 | 1.06E-02 | 3.7247 | 0.002533007 | 1.5226E-05 |
| SUB-SCANNING | -3.427E-02 | -7.573E-02 | -1.73E-02 | 3.81E-02 | 3.7247 | 0.023323039 | 0.000140195 | f2 PLASTIC LENS PARAXIAL POWER

| | PARAXIAL CURVATURE | | EACH SURFACE POWER | | EQUIVALENT INTERVAL | PARAXIAL POWER AS LENS | $\phi/\nu$ |
|---|---|---|---|---|---|---|---|
| | INCIDENT SURFACE | OUTGOING SURFACE | INCIDENT SURFACE | OUTGOING SURFACE | | | |
| MAIN SCANNING | -8.886E-04 | -9.697E-04 | -4.47E-04 | 4.88E-04 | 3.92424 | 4.17008E-05 | 2.50665E-07 |
| SUB-SCANNING | 1.190E-02 | 3.824E-04 | 5.99E-03 | -1.93E-04 | 3.92424 | 0.005803866 | 3.48872E-05 |

DIFFRACTIVE SURFACE POWER

| | INCIDENT SURFACE | OUTGOING SURFACE | $\phi/\nu$ | $\Sigma\phi/\nu$ |
|---|---|---|---|---|
| MAIN SCANNING | — | -5.08E-07 | 5.47051E-09 | 1.58579E-06 |
| SUB-SCANNING | — | -3.11E-04 | 3.34599E-06 | 0.000228468 |

FIG.13

ECCENTRICITY, INCLINATION DATA OF EACH LOCAL COORDINATE SYSTEM

| SURFACE No. | ECCENTRICITY | | | | | | INCLINATION ANGLE | | | | |
|---|---|---|---|---|---|---|---|---|---|---|---|
| | y DIRECTION COMMON | z DIRECTION | | | | AROUND z AXIS COMMON | AROUND y AXIS | | | | |
| | | COMMON | RAY1 | RAY2 | RAY3 | RAY4 | | RAY1 | RAY2 | RAY3 | RAY4 |
| PRE-DEFLECTION OPTICAL SYSTEM | | | | | | | | | | | |
| 1 | | | 5.3 | 0.5 | -1.9 | -5.3 | | -0.0216 | 0.0009 | 0.0042 | 0.0216 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | -1.0197 | | | | |
| 9 | | | | | | | 1.0970 | | | | |
| 10 | -1.4 | | | | | | | | | | |
| POST-DEFLECTION OPTICAL SYSTEM | | | | | | | | | | | |
| 11 | | | | | DEFLECTION SURFACE | | -1.0197 | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | 0.0012 | 0.3695 | 0.4292 | 0.5300 |
| 19 | | | | | | | | 0.0012 | -0.3695 | -0.4292 | -0.5300 |
| 20 | | | | | | | | | | | |

FIG. 14

COEFFICIENT TABLE 1    COEFFICIENT VALUE OF $a_{lm}$

| m\l | 0 | 1 | 2 | 3 | 4 | 5 | 6 | 7 | 8 | 9 | 10 |
|---|---|---|---|---|---|---|---|---|---|---|---|
| 0 | 0 | 0.008418 | -3.3E-05 | -3.3E-06 | -3.3E-06 | 1.93E-09 | 4.89E-09 | 1.29E-11 | -7.8E-12 | -1E-14 | 3.38E-15 |
| 2 | 0.054616 | 8.47E-05 | -2E-06 | 1.34E-07 | 8.78E-10 | -2.7E-10 | -1.8E-11 | 6.47E-13 | -1.7E-13 | 9.57E-17 | 2.07E-16 |
| 4 | 0.000112 | -3.4E-07 | -1.4E-07 | -9.1E-09 | -1.9E-09 | 3.25E-11 | 8.04E-12 | 2.86E-15 | -8.2E-15 | -7.1E-17 | 1.68E-18 |
| 6 | -1.2E-06 | 2.06E-08 | -3.1E-09 | -1.3E-10 | 3.23E-11 | 1.3E-12 | -1.5E-13 | -5.1E-15 | 2.38E-16 | 5.07E-18 | -1.2E-19 |
| 8 | 9.76E-09 | -1.7E-10 | -2.5E-11 | 3.8E-12 | 1.97E-13 | -2.5E-14 | -2.5E-16 | 6.68E-17 | -1.2E-19 | -5.4E-20 | 2.61E-22 |

COEFFICIENT TABLE 2    COEFFICIENT VALUE OF $a_{lm}$

| m\l | 0 | 1 | 2 | 3 | 4 | 5 | 6 | 7 | 8 | 9 | 10 |
|---|---|---|---|---|---|---|---|---|---|---|---|
| 0 | 0 | 0.010488 | -9.5E-05 | -2.6E-06 | -3E-06 | 4.81E-10 | 2.46E-09 | 7.21E-12 | -3.1E-12 | -2.1E-15 | 1.94E-16 |
| 2 | 0.010488 | 6.32E-05 | -7.3E-08 | 1.06E-07 | -2.3E-09 | -1.8E-10 | 2.12E-11 | 3.5E-13 | -1.8E-13 | 2.86E-16 | 1.46E-16 |
| 4 | 2.23E-05 | 3.22E-07 | -7.6E-08 | -8.1E-09 | -1.3E-09 | 2.3E-11 | 3.25E-12 | -1.1E-14 | -6.2E-16 | -2.8E-17 | -1.9E-18 |
| 6 | -9.3E-07 | -9.7E-09 | 5.18E-11 | 9.22E-11 | 3.37E-11 | 3.08E-13 | -8.8E-14 | -1.4E-15 | 4.6E-17 | 1.47E-18 | 1.58E-20 |
| 8 | 3.19E-09 | -1.6E-11 | -1.7E-11 | 4.67E-13 | 1.82E-14 | -8.4E-15 | -1.9E-16 | 2.1E-17 | 5.6E-19 | -1.6E-20 | -4.1E-22 |

COEFFICIENT TABLE 3    COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00491 | -3.8E-05 | 4.21E-07 | -1E-07 | 3.05E-11 | 1.31E-11 | 2.34E-15 | -8E-16 | 2E-19 | -4.8E-22 | -1.2E-23 | 3.35E-25 |
| 2 | 0.000888 | -4.7E-06 | 3.48E-07 | -2.6E-10 | 6.83E-11 | -1.2E-13 | -1E-14 | -1.4E-18 | -1.1E-18 | 7.87E-24 | 3.71E-23 | -1.4E-26 | 5.56E-28 |
| 4 | 2.12E-06 | -4.3E-09 | -2.6E-10 | -2.2E-12 | 7.36E-14 | -1.2E-16 | 2.06E-17 | -2E-20 | 5.72E-22 | 4.38E-24 | -2.3E-26 | -4.9E-28 | -8.1E-31 |
| 6 | -2E-08 | 1.78E-10 | -2.8E-12 | 1.27E-15 | -5.1E-16 | -2.7E-19 | 8.78E-20 | 7.29E-24 | 2.13E-23 | -1E-26 | 1.16E-27 | 2.57E-30 | -4.4E-32 |
| 8 | 4.61E-11 | 3.91E-14 | 3.24E-14 | -1.2E-16 | -4.4E-18 | 5.23E-22 | -1.3E-22 | 1.56E-24 | 9.34E-26 | 4.58E-30 | -3E-30 | -1.8E-33 | -1.3E-33 |

COEFFICIENT TABLE 4    COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00677 | -0.000072 | 4.65E-07 | -1E-08 | 3.19E-11 | 2.66E-12 | 2.04E-15 | 3.27E-16 | 2.72E-19 | -6.5E-20 | -1E-23 | 1.58E-24 |
| 2 | -0.00458 | -4.5E-06 | 2.67E-07 | -2.3E-10 | 4.36E-11 | -1.1E-13 | -2.6E-15 | -1.7E-18 | -1.5E-18 | -4.4E-23 | 5.02E-24 | -1.3E-26 | 1.89E-27 |
| 4 | 1.14E-06 | -4.4E-09 | -1.6E-10 | -2.2E-12 | 4.77E-14 | 2.26E-16 | -5.5E-18 | -4.6E-20 | 2.5E-21 | -7.4E-26 | 7.76E-27 | 1.35E-28 | -7.4E-31 |
| 6 | 5.5E-09 | 1.94E-10 | -1.7E-12 | -5.7E-15 | 3.42E-16 | -2.6E-19 | 2.08E-20 | -2.1E-22 | 2.55E-23 | 5.35E-27 | 1.61E-27 | -9.1E-32 | -9.5E-32 |
| 8 | -6E-12 | -1.9E-13 | -8E-16 | -8.2E-17 | -6.5E-18 | 2.62E-21 | 5.1E-22 | 1.12E-24 | 3.77E-26 | 2.5E-28 | -4E-30 | -9.3E-33 | -9.8E-34 |

FIG.15

COEFFICIENT TABLE 4
OPTICAL PATH DIFFERENCE FUNCTION COEFFICIENT $c_{lm}$

| m\l | 0 | 1 | 2 | 3 | 4 |
|---|---|---|---|---|---|
| 0 | 0 | 0 | 0 | 0 | 0 |
| 2 | 0.000155 | 0 | 2.54E-07 | 0 | -9.2E-11 |
| 4 | -2.6E-06 | 0 | 1.32E-08 | 0 | 8.48E-13 |
| 6 | 1.11E-08 | 0 | 1.99E-12 | 0 | 1.1E-14 |
|   |   | 0 | -8.6E-13 | 0 | -1.1E-17 |

FIG.17

AMOUNT OF CHANGE AT TIME OF TEMPERATURE RISE OF 15 DEGREES

| | BEAM POSITION IN SUB-SCANNING DIRECTION | DEFOCUS IN MAIN SCANNING DIRECTION | DEFOCUS IN SUB-SCANNING DIRECTION | BEAM POSITION IN SUB-SCANNING DIRECTION (LBO) | $\alpha_H \times LBO \times t$ | RAY4 REFERENCE BEAM INTERVAL CHANGE AMOUNT |
|---|---|---|---|---|---|---|
| ray1 | 0.006 | 0.0 | 0.2 | 11.7 | 0.004 | 0.011 |
| ray2 | -0.005 | 0.0 | -0.4 | 2.7 | 0.001 | 0.001 |
| ray3 | 0.007 | 0.0 | -0.4 | -4.9 | -0.002 | 0.012 |
| ray4 | -0.006 | 0.0 | 0.2 | -11.3 | -0.004 | 0.000 |

RAY1 SUB-SCANNING DIRECTION MOVEMENT AMOUNT — RAY4 SUB-SCANNING DIRECTION MOVEMENT AMOUNT = 0.011

FIG.18

POLYGON MIRROR INSCRIBED CIRCLE DIAMETER    40.0

POLYGON MIRROR ROTATION CENTER POSITION    Y 17.2    Z 10.1
(POSITION SEEN FROM POLYGON REFLECTING SURFACE LOCAL COORDINATE SYSTEM)

|  | RAY1 | RAY2 | RAY3 | RAY4 |
|---|---|---|---|---|
| FINITE LENS IMAGING POSITION | 5518.7 | 4106.4 | 4336.0 | 5579.3 |

| | SURFACE No. | CURVATURE | | TH | | | | | REFRACTIVE INDEX N | REMARKS |
|---|---|---|---|---|---|---|---|---|---|---|
| | | MAIN SCANNING cuy | SUB-SCANNING cuz | COMMON | RAY1 | RAY2 | RAY3 | RAY4 | | |
| PRE-DEFLECTION OPTICAL SYSTEM | 1 | 0 | 0.0183 | 5.0 | 33.3 | 33.3 | 33.3 | 33.3 | | |
| | 2 | | | | -0.2 | -3.1 | -2.6 | -0.1 | 1.514 | |
| | 3 | | | 67.9 | | | | | | |
| | 4 | | | 10.0 | | | | | | |
| | 5 | | | 14.3 | | | | | 1.514 | |
| | 6 | | | 2.0 | | | | | | |
| | 7 | | | 11.1 | | | | | 1.514 | |
| | 8 | | | | | | | | | |
| POST-DEFLECTION OPTICAL SYSTEM | 9 | | | 0.0 | | | | | | DEFLECTION SURFACE |
| | 10 | | | 0.0 | | | | | 0.000 | |
| | 11 | | | 0.0 | | | | | | |
| | 12 | 3.7108E-08 | 0 | 0.0 | | | | | | PLASTIC LENS. CURVED SURFACE POLYNOMIAL COEFFICIENT: TABLE 3 |
| | 13 | 5.242E-08 | 0 | -73.2 | | | | | 0.000 | PLASTIC LENS. CURVED SURFACE POLYNOMIAL COEFFICIENT: TABLE 4 |
| | 14 | 6.7995E-11 | 0 | 0.0 | | | | | | PLASTIC LENS. CURVED SURFACE POLYNOMIAL COEFFICIENT: TABLE 5 |
| | 15 | 5.6139E-11 | 0 | 0.0 | | | | | 0.000 | PLASTIC LENS. CURVED SURFACE POLYNOMIAL COEFFICIENT: TABLE 6 |
| | 16 | | | 0.0 | | | | | | |
| | 17 | | | | 0.0 | 0.0 | 0.0 | 0.0 | 0.000 | |
| | 18 | | | -83.0 | | | | | | |

GLASS (BK7):1.514
PLASTIC LENS:1.507

REFRACTIVE INDEX, DISTANCE BETWEEN SURFACES AND SHAPE DATA AFTER REFLECTION HAVE THE FORM WITH "−".
LENS SURFACE SHAPE WITH CURVED POLYNOMIAL COEFFICIENT DATA IS INDICATED BY THE FOLLOWING EXPRESSION.
$x=(cuy*y^2+cuz*z^2)/(1+Sqrt(1-ay*cuy^2*y^2-az*cuz^2*z^2)) + \Sigma a_m*y^i*z^j$ IN THIS EXAMPLE, $ay=1, az=1$
y DIRECTION: MAIN SCANNING DIRECTION, z DIRECTION: SUB-SCANNING DIRECTION, x DIRECTION: OPTICAL AXIS DIRECTION (+ SIDE IN EACH LOCAL COORDINATE SYSTEM OF PRE-DEFLECTION OPTICAL SYSTEM, − SIDE IN EACH LOCAL COORDINATE SYSTEM OF POST-DEFLECTION OPTICAL SYSTEM)

FIG.19

PLASTIC LENS PARAXIAL POWER BEFORE DEFLECTION

| | PARAXIAL CURVATURE | | EACH SURFACE POWER | | EQUIVALENT INTERVAL | PARAXIAL POWER AS LENS |
|---|---|---|---|---|---|---|
| | INCIDENT SURFACE | OUTGOING SURFACE | INCIDENT SURFACE | OUTGOING SURFACE | | |
| MAIN SCANNING | 0.000E+00 | 0.000E+00 | 0.00E+00 | 0.00E+00 | 0 | 0 |
| SUB-SCANNING | 0.000E+00 | 0.000E+00 | 0.00E+00 | 0.00E+00 | 0 | 0 |

FIG.20

ECCENTRICITY, INCLINATION DATA OF EACH LOCAL COORDINATE SYSTEM

| SURFACE No. | ECCENTRICITY | | | | | | | | INCLINATION ANGLE | | | |
|---|---|---|---|---|---|---|---|---|---|---|---|---|
| | y DIRECTION | | z DIRECTION | | | | AROUND z AXIS | | AROUND y AXIS | | | |
| | COMMON | COMMON | RAY1 | RAY2 | RAY3 | RAY4 | COMMON | RAY1 | RAY2 | RAY3 | RAY4 | |
| 1 | | | 5.3 | 0.5 | -1.9 | -5.3 | | -0.0216 | 0.0009 | 0.0042 | 0.0216 | PRE-DEFLECTION OPTICAL SYSTEM |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | 0.0 | | | | | | | | | | |
| 8 | | 0.0 | | | | | | | | | | |
| 9 | | | | | | | -1.0197 | | | | | |
| 10 | -1.4 | | | | | | 1.0197 | | | | | |
| 11 | | | | | | | 22.0000 | | | | | DEFLECTION SURFACE |
| 12 | | | | | | | | | | | | POST-DEFLECTION OPTICAL SYSTEM |
| 13 | | | | | | | | | | | | |
| 14 | | | | | | | | | | | | |
| 15 | | | | | | | | | | | | |
| 16 | | | | | | | | | | | | |
| 17 | | | | | | | | | | | | |
| 18 | | | | | | | | -1.5144 | 0.0000 | 0.0000 | 0.0000 | |
| 19 | | | | | | | | -1.0000 | 0.0000 | 0.0000 | 0.0000 | |
| 20 | | | | | | | | | | | | |

FIG.21

AMOUNT OF CHANGE AT TIME OF
TEMPERATURE RISE OF 15 DEGREES

| | BEAM POSITION IN SUB-SCANNING DIRECTION | DEFOCUS IN MAIN SCANNING DIRECTION | DEFOCUS IN SUB-SCANNING DIRECTION | BEAM POSITION (LBO) | $\alpha_H \times LBO \times t$ | RAY4 REFERENCE BEAM INTERVAL CHANGE AMOUNT |
|---|---|---|---|---|---|---|
| ray1 | 0.045 | 0.7 | 1.9 | 7.4 | 0.002 | 0.090 |
| ray2 | 0.005 | 0.7 | 2.0 | 0.5 | 0.000 | 0.050 |
| ray3 | -0.017 | 0.7 | 2.0 | -5.1 | -0.002 | 0.028 |
| ray4 | -0.045 | 0.7 | 1.9 | -9.1 | -0.003 | 0.000 |

| | | 0.090 |

RAY1 SUB-SCANNING DIRECTION MOVEMENT AMOUNT — RAY4 SUB-SCANNING DIRECTION MOVEMENT AMOUNT

OPTICAL BEAM SCANNING DEVICE, OPTICAL BEAM SCANNING METHOD

BACKGROUND OF THE INVENTION

1. Field of the Invention

The present invention relates to an optical beam scanning device to scan a light flux from a light source onto a photosensitive surface of a photosensitive body in a main scanning direction, and particularly to a technique to realize an improvement in optical characteristics of a scanning light.

2. Description of the Related Art

Hitherto, there is known a technique in which in an optical beam scanning device which shapes a light flux from light source into a specified sectional shape and scans it in a specified direction, a lens having a negative power or a diffractive optical element to allow light fluxes from plural light sources to pass through is provided in a pre-deflection optical system, so that when a temperature change occurs, a beam interval is changed in a direction of suppressing a color shift occurring in an image forming apparatus including the optical beam scanning device (JP-A-2005-221870).

Besides, there is also known an optical beam scanning device in which a resin lens having one surface of an anamorphic refractive surface and the other surface of an elliptical power diffractive surface is arranged in front of a reflecting surface of a deflector, and the power of the power diffractive surface is set so that a variation of position (beam waist position) where a beam diameter in a main scanning direction and/or a sub-scanning direction is converged becomes substantially zero (JP-A-2006-154701).

Besides, there is also known a structure in which a diffractive lens having a diffractive surface to correct a chromatic aberration of magnification is provided in a post-deflection optical system, so that the length of a scanning line in a main scanning direction does not fluctuate according to wavelength variation (JP-A-2006-171117).

Besides, there is known a structure in which an optical element in a post-deflection optical system is constructed of refractive surfaces and diffractive surfaces, the radius of curvature of at least one refractive surface thereof in a sub-scanning direction is continuously changed correspondingly to a main scanning direction from a position on an axis to a position outside the axis, and the diffraction power of at least one diffractive surface in the sub-scanning direction is continuously changed correspondingly to the main scanning direction from a position on the axis to a position outside the axis, so that the F number (Fno), in the sub-scanning direction, of the light flux incident on the surface to be scanned is made substantially constant in an image effective area (JP-A-2002-221681).

Besides, there is also known a structure in which a plastic lens having a negative power is arranged for each light flux guided in a pre-deflection optical system, and the occurrence of defocus at the time of temperature change is prevented (JP-A-8-136839).

However, in the structure disclosed in JP-A-2005-221870, there is a case in which the object can not be achieved according to the combination of materials of a housing of the optical beam scanning device, a frame to position the plural photosensitive bodies, and a shaft to drive an intermediate transfer belt for superimposing developed images on the plural photosensitive bodies and the temperature distribution. Besides, according to a condition, the defocus change amount at the time of temperature change can not be sufficiently suppressed.

Besides, in the structure disclosed in JP-A-2006-154701, since the light beam passes along the optical axis of the resin lens in the sub-scanning direction, the optical path in the sub-scanning direction can not be changed according to the temperature change, and the color shift caused by the thermal expansion of an image forming apparatus can not be corrected.

Besides, in the structures disclosed in JP-A-2006-171117 and JP-A-2002-221681, since it is not considered to correct the position shift of a scanning line in the sub-scanning direction caused by the thermal expansion of an image forming apparatus, the color shift caused by the temperature rise of the image forming apparatus occurs. Further, in the structure, according to the combination of materials of a housing of the optical beam scanning device, a frame to position plural photosensitive bodies, and a shaft to drive an intermediate transfer belt to superimpose developed images on the plural photosensitive bodies and the temperature distribution, there is a case where the change amount of a beam interval can not sufficiently meet the expansion of the image forming apparatus. Besides, according to a condition, the defocus change amount at the time of temperature change can not be sufficiently suppressed.

SUMMARY OF THE INVENTION

An embodiment of the invention has an object to provide a technique in which in an optical beam scanning device, optical characteristics can be suitably corrected according to a change in environmental temperature.

In order to solve the problem, according to an aspect of the invention, an optical beam scanning device is configured to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of each of plural photosensitive bodies by a post-deflection optical system, the pre-deflection optical system includes a first optical element which is an optical element having a negative power and in which a main light beam of the light flux guided in the pre-deflection optical system passes along an optical axis of the optical element, and the post-deflection optical system includes at least one second optical element which is an optical element including a diffraction grating formed on at least one of a light flux incident surface and a light flux outgoing surface and in which main light beams of light fluxes to be guided to the respective plural photosensitive bodies are incident on incident positions different from each other in a sub-scanning direction orthogonal to the main scanning direction.

Besides, according to another aspect of the invention, an optical beam scanning device is configured to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of a photosensitive body by a post-deflection optical system, the pre-deflection optical system includes a first optical element which is an optical element having a negative power and in which a main light beam of the light flux guided in the pre-deflection optical system passes along an optical axis of the optical element, and the post-deflection optical system includes at least one second optical element which is an optical element including a diffraction grating formed on at least one of a light flux incident surface and a light flux outgoing surface and in which the main light beam of the light flux from the pre-deflection optical system is incident on an incident position different from an optical path of an optical axis of the post-deflection optical system in a sub-scanning direction orthogonal to the main scanning direction.

Besides, according to another aspect of the invention, an optical beam scanning method is to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of each of plural photosensitive bodies by a post-deflection optical system, the light flux is guided in the pre-deflection optical system by a first optical element which is an optical element having a negative power and in which a main light beam of the light flux guided in the pre-deflection optical system passes along an optical axis of the optical element, and the light flux is guided in the post-deflection optical system by at least one second optical element which is an optical element including a diffraction grating formed on at least one of a light flux incident surface and a light flux outgoing surface and in which main light beams of light fluxes to be guided to the respective plural photosensitive bodies are incident on incident positions different from each other in a sub-scanning direction orthogonal to the main scanning direction.

Besides, according to another aspect of the invention, an optical beam scanning device is configured to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of each of plural photosensitive bodies by a post-deflection optical system, the pre-deflection optical system includes first power giving means which is power giving means having a negative power and in which a main light beam of the light flux guided in the pre-deflection optical system passes along an optical axis of the power giving means, and the post-deflection optical system includes at least one second power giving means which is power giving means including a diffraction grating formed on at least one of a light flux incident surface and a light flux outgoing surface and in which main light beams of light fluxes to be guided to the respective plural photosensitive bodies are incident on incident positions different from each other in a sub-scanning direction orthogonal to the main scanning direction.

Besides, according to another aspect of the invention, an optical beam scanning device is configured to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of a photosensitive body by a post-deflection optical system, the pre-deflection optical system includes first power giving means which is power giving means having a negative power and in which a main light beam of the light flux guided in the pre-deflection optical system passes along an optical axis of the power giving means, and the post-deflection optical system includes at least one second power giving means which is power giving means including a diffraction grating formed on at least one of a light flux incident surface and a light flux outgoing surface and in which the main light beam of the light flux from the pre-deflection optical system is incident on an incident position different from an optical path of an optical axis of the post-deflection optical system in a sub-scanning direction orthogonal to the main scanning direction.

Besides, according to another aspect of the invention, an image forming apparatus includes the optical beam scanning device of the structure as stated above, a photosensitive body on which an electrostatic latent image is formed with a light flux scanned by the optical beam scanning device, and a developing unit to develop the electrostatic latent image formed on the photosensitive body.

DESCRIPTION OF THE DRAWINGS

FIG. 10 is a view showing an example of a definition expression for defining the shape of a lens surface.

FIG. 11 is a view showing optical design data of each optical element in an example of the invention.

FIG. 12 is a data table showing the paraxial power of each optical element.

FIG. 13 is a data table showing an eccentricity amount and an inclination of each optical element in the example.

FIG. 14 is a view showing a data table of coefficient values.

FIG. 15 is a view showing a coefficient table of an optical path difference function.

FIG. 17 is a view for explaining effects of the example.

FIG. 18 is a view showing optical design data of each optical element in a comparative example.

FIG. 19 is a data table showing the paraxial power of a plastic lens arranged in a pre-deflection optical system in the comparative example.

FIG. 20 is a data table showing an eccentricity amount and an inclination of each optical element in the comparative example.

FIG. 21 is a view showing a defocus change amount at the time of temperature change in the structure of the comparative example.

DESCRIPTION OF THE EMBODIMENTS

Hereinafter, an embodiment of the invention will be described with reference to the drawings.

Figure 1:
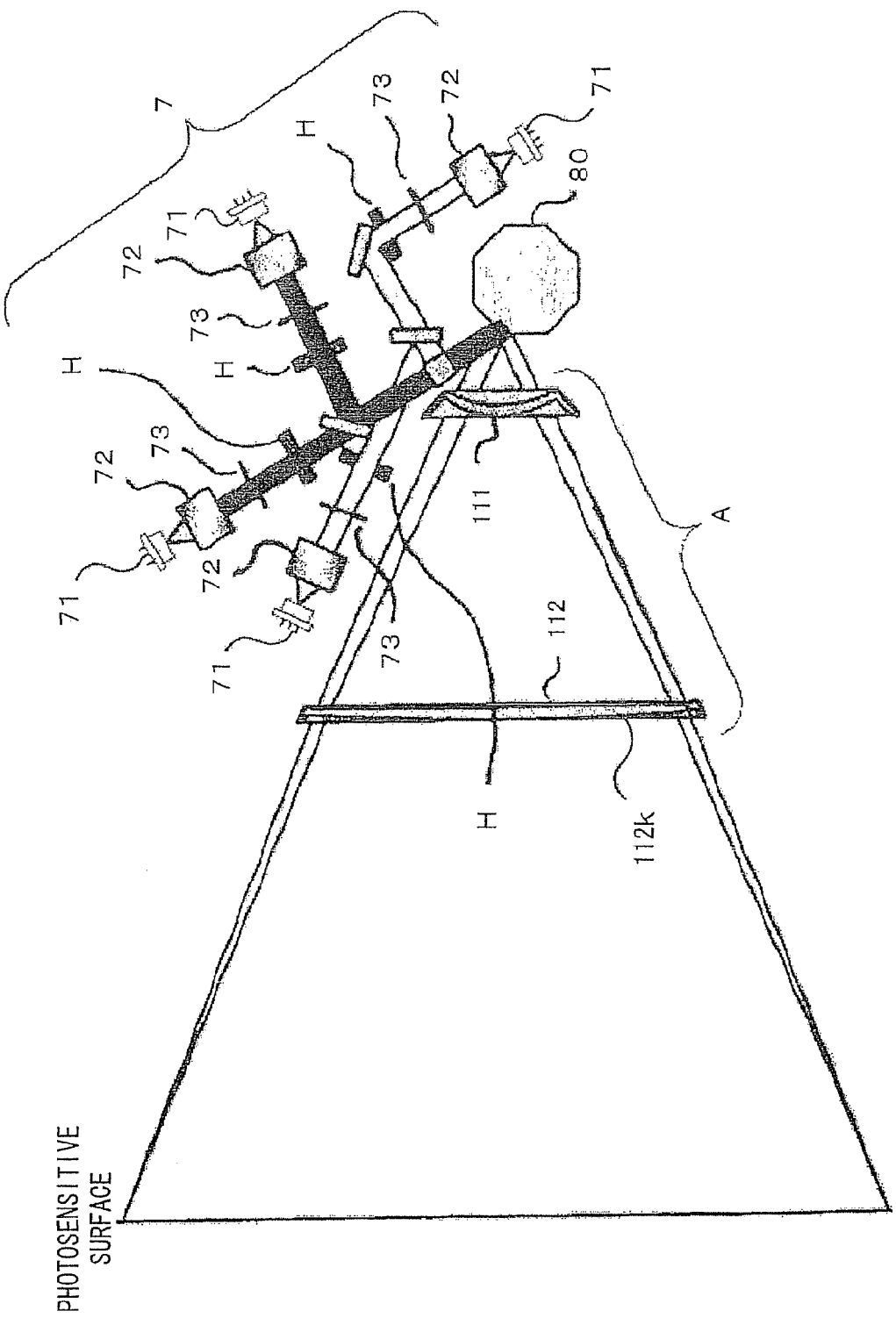
FIG. 1 is a view in which an optical path of an optical system in an optical beam scanning device according to an embodiment of the invention is seen in a sub-scanning direction.
Figure 2:
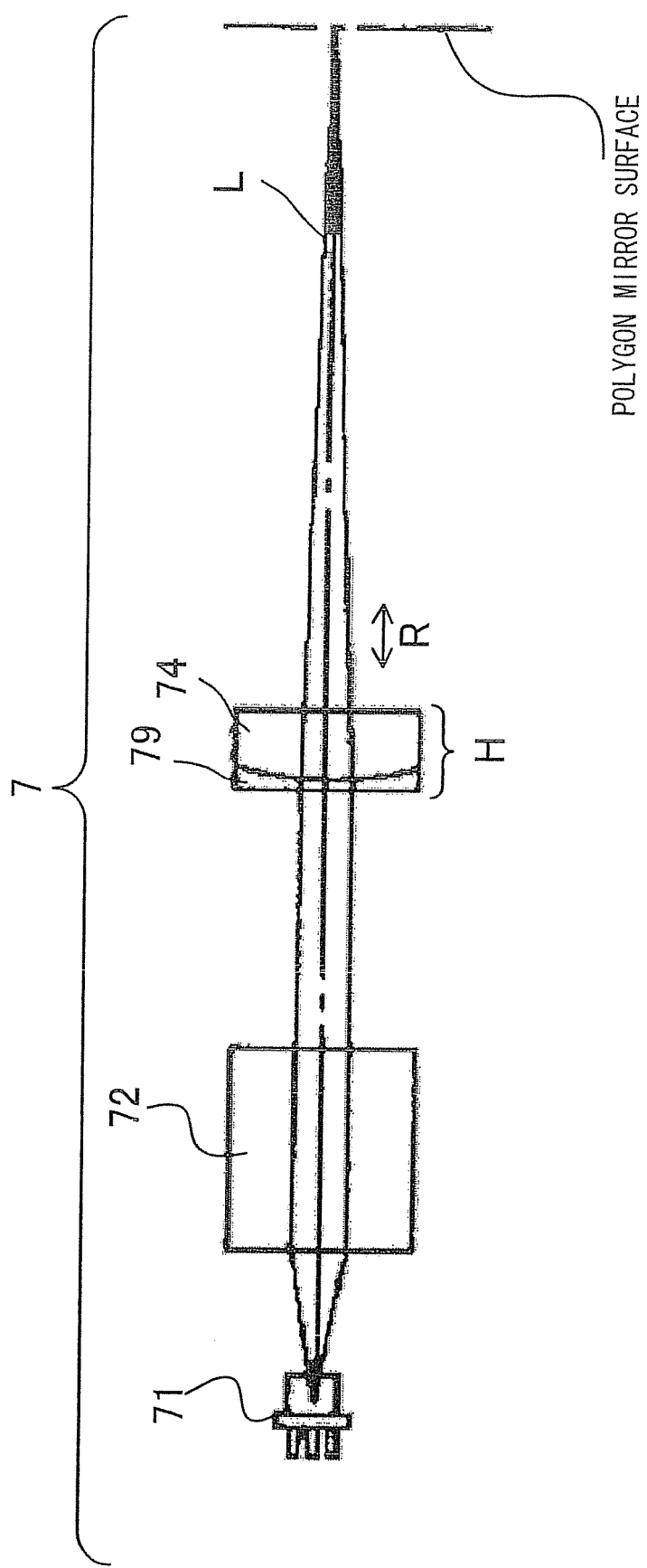
FIG. 2 is a view showing the details of a structure of a pre-deflection optical system in the optical beam scanning device according to the embodiment.
Figure 3:
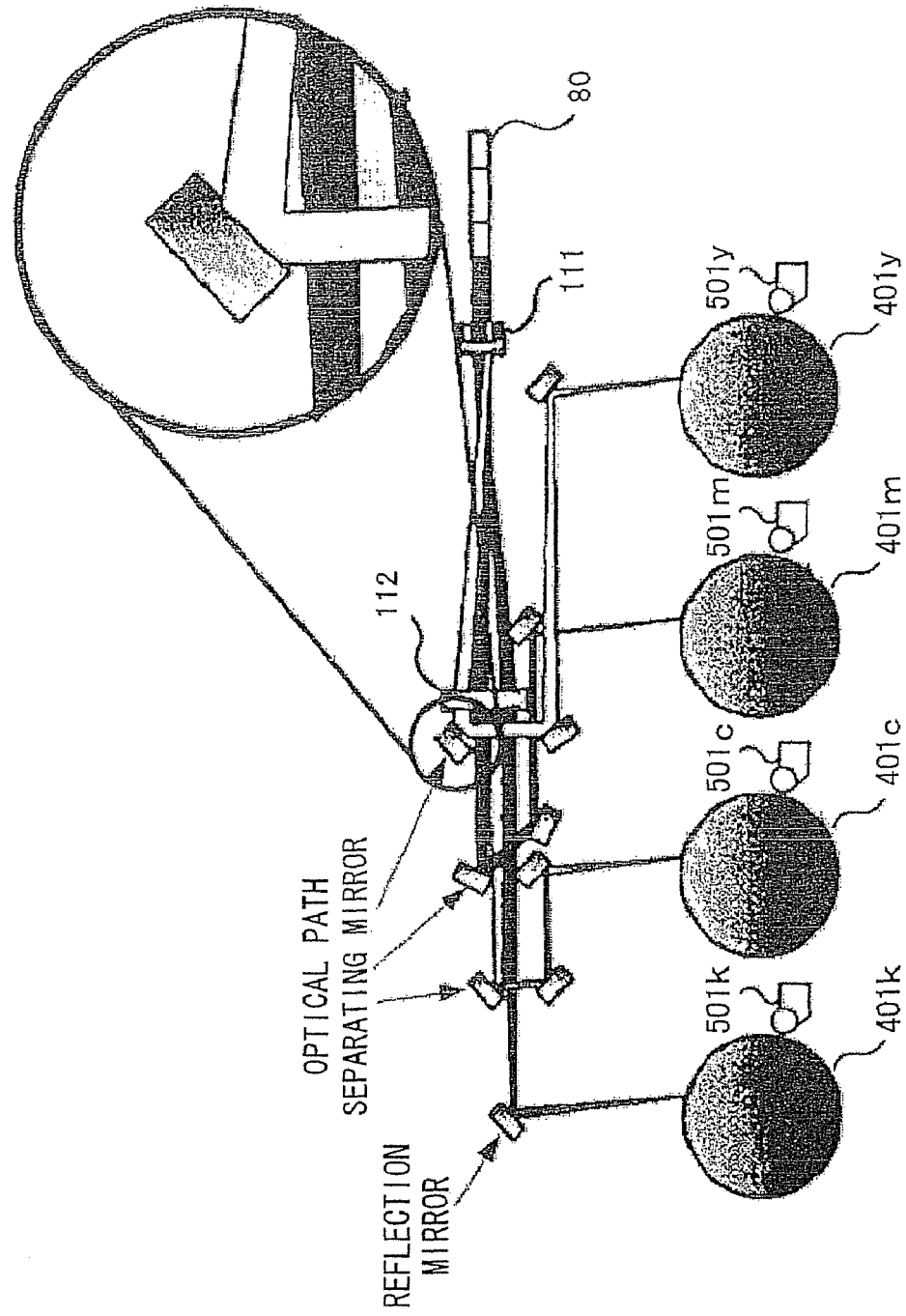
FIG. 3 is a sub-scanning direction sectional view showing a rough structure of an image forming apparatus 900 including the optical beam scanning device according to the embodiment.

FIG. 1 is a view in which an optical path of an optical system in an optical beam scanning device according to the embodiment of the invention is seen in a sub-scanning direction, FIG. 2 is a view showing the details of a structure of a pre-deflection optical system in the optical beam scanning device according to the embodiment, and FIG. 3 is a sub-scanning direction sectional view showing a rough structure of an image forming apparatus 900 including the optical beam scanning device according to the embodiment.

As shown in FIG. 1 to FIG. 3, an optical beam scanning device 1 according to the embodiment includes a pre-deflection optical system 7, a polygon mirror (rotation deflector) 80, and a post-deflection optical system A.

The optical beam scanning device 1 shapes a divergent light form a light source into a light flux having a specified sectional shape by the pre-deflection optical system including plural optical elements, deflects the light flux shaped by the pre-deflection optical system 7 by the rotation deflector, and scans the light flux through the post-deflection optical system A onto a photosensitive surface of each of plural photosensitive bodies 401y to 401k in a main scanning direction. The light flux scanned by the optical beam scanning device 1 forms electrostatic latent images on the photosensitive surfaces of the photosensitive bodies 401y to 401k. The electrostatic latent images formed on the respective photosensitive bodies are developed with developers of colors corresponding to the respective photosensitive bodies by developing units 501y to 501k.

Hereinafter, the details of the optical beam scanning device 1 according to the embodiment will be described.

The polygon mirror 80 scans the incident light flux in the main scanning direction by reflecting and deflecting the incident light flux by plural reflecting surfaces arranged in the rotation direction.

The pre-deflection optical system 7 includes a light source 71 made of an LD, a finite focal lens (or a collimeter lens) 72 to cause a divergent light from the light source 71 to become a convergent light, a parallel light or a gently diffused light, an aperture 73 (omitted in FIG. 2), a single-sided convex glass cylinder lens 74 to condense the light flux in the sub-scanning direction in the vicinity of the reflecting surface of the polygon mirror 80, and an optical element 79 (first optical element, first power giving means) having a negative power in the sub-scanning direction. The optical element 79 here is added to an upstream side (incident surface side, cylindrical surface side) of the cylinder lens 74 in a light flux traveling direction, and the optical element 79 and the cylinder lens 74 are located to be integrally movable (to be capable of adjusting the position in an optical axis L direction) in a direction (arrow R direction) substantially parallel to an optical axis L of the pre-deflection optical system 7. A hybrid lens H is constructed of the integrally arranged optical element 79 and the cylinder lens 74. Besides, the pre-deflection optical system 7 has such optical path that a main light beam of the light flux passing through the optical element 79 passes through the optical axis of the optical element 79.

By the structure as stated above, the pre-deflection optical system 7 shapes the light from the light source 71 into the light flux having a specified sectional shape which is, for example, long in the main scanning direction, guides it to the polygon mirror 80, and condenses the light flux in the sub-scanning direction in the vicinity of the reflecting surface of the polygon mirror 80. The light source 71, the finite focal lens 72, the aperture 73, the cylinder lens 74 and the optical element 79 (hybrid lens H) in the pre-deflection optical system 7 are individually provided for each of light fluxes guided from respective plural light sources corresponding to the respective photosensitive bodies (see FIG. 1).

The post-deflection optical system A includes an fθ1 lens 111 and an fθ2 lens 112 (second optical element, second power giving means), which is made of resin material such as plastic and has a free curved surface with such a power distribution that the power is continuously changed.

The respective pre-deflection optical systems 7 to guide the light fluxes to the respective plural photosensitive bodies are arranged with heights in the sub-scanning direction and inclinations different from each other. The post-deflection optical system A guides the light fluxes from the respective plural pre-deflection optical systems through different optical paths to the photosensitive surfaces of the photosensitive bodies 401y to 401k corresponding to the respective optical systems.

In the fθ1 lens 111 and the fθ2 lens 112, the curvatures are independently changed in two directions of the main scanning direction and the sub-scanning direction. The fθ1 lens 111 and the fθ2 lens 112 here are equivalent to the common (shared) optical element. The power distribution of the fθ1 lens 111 and the fθ2 lens 112 is set to be the power distribution to give such a power that with respect to all light fluxes reflected and deflected by the polygon mirror 80 and guided to the respective plural photosensitive bodies 401y to 401k (all light fluxes incident from the pre-deflection optical system to guide the light fluxes from the plural light sources and reflected and deflected), the light fluxes guided to the photosensitive surfaces by the post-deflection optical system A have specified optical characteristics (for example, characteristics to satisfy specified conditions as to the beam diameter of the light flux, the degree of bending of the scanning line, the position of the light flux to the scanning range and the like) on the photosensitive surfaces according to the incident positions of the light fluxes. As stated above, the common optical element has the smooth lens surface acting on all light fluxes which are guided to the polygon mirror 80 by the plural pre-deflection optical systems having light axes different from each other in passing positions in the sub-scanning direction, are reflected and deflected by the polygon mirror 80, and are incident on positions different from each other in the sub-scanning direction.

As stated above, the power is given by the common optical element to all light fluxes to be guided to the plural photosensitive bodies, and this can contribute to the reduction of the arrangement space of optical parts in the sub-scanning direction. Besides, since the number of optical parts to be arranged can be reduced, the deterioration of optical characteristics due to the arrangement error of the respective optical parts can be avoided, and this can also contribute to the reduction in cost. Further, since the respective light beams similarly receive the influence of the arrangement error, they have the same direction with respect to "bending of a scanning line" and "inclination", and color superimposition shift can also be reduced.

Incidentally, the "specified optical characteristics" here mean optical characteristics desirable in forming the electrostatic latent image on the photosensitive surface of photosensitive body.

When the common optical element is constructed of the plural lenses as stated above, as compared with a case where it is constructed of one lens, the curvature of the lens surface of each lens can be set to be gentle, and working becomes easy, and this can contribute to the reduction in manufacturing cost and the improvement in working precision (improvement in optical characteristics).

Incidentally, in the case where the common optical element is constructed of the fθ1 lens 111 and the fθ2 lens 112, for example, both the incident surface and the outgoing surface of each of the fθ1 lens 111 and the fθ2 lens 112 can be set to have the continuously changed power distribution, however, it is not always necessary to set such power distribution for all lens surfaces of the common optical element. In general, in the case where the common optical element is constructed of the plural lenses, the size of the lens positioned at the downstream side in the light flux traveling direction is often large. That is, the light flux incident on the lens at the downstream side in the light flux traveling direction has a small beam diameter as compared with the lens positioned at the upstream side, and the move distance of the light flux is large for the same swing angle, and accordingly, it is conceivable that the effect of the continuously changed power distribution is large. Thus, in the case where the common optical element as stated above is constructed of the plural lenses, it is preferable that the continuously changed power as stated above is given to the outgoing surface side of the lens positioned at the most downstream side in the light flux traveling direction (that is, at the side closest to the image surface).

Figure 4:
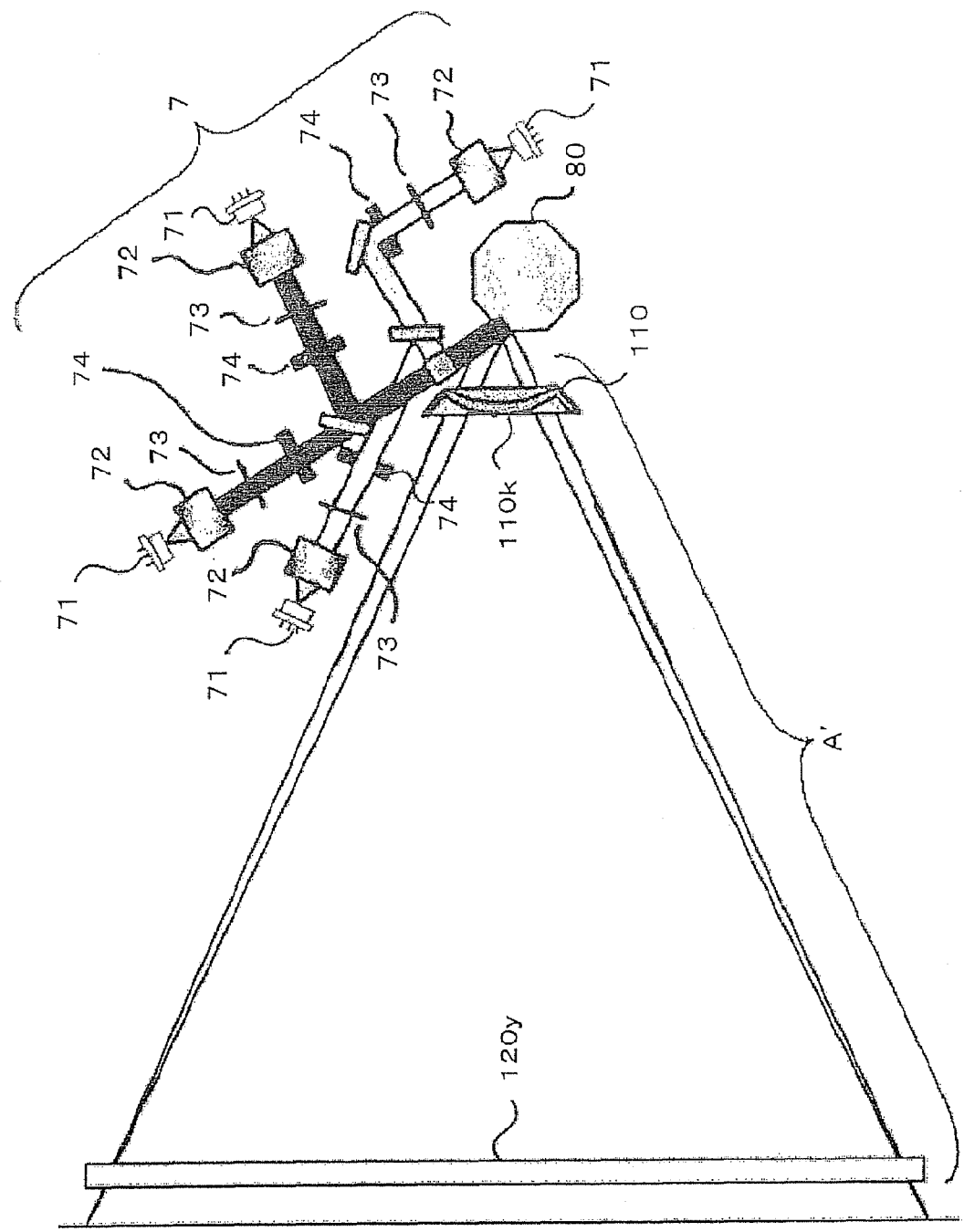
FIG. 4 is a view showing an example of a post-deflection optical system A' in which a common optical element is constructed of one fθ lens 110.
Figure 5:
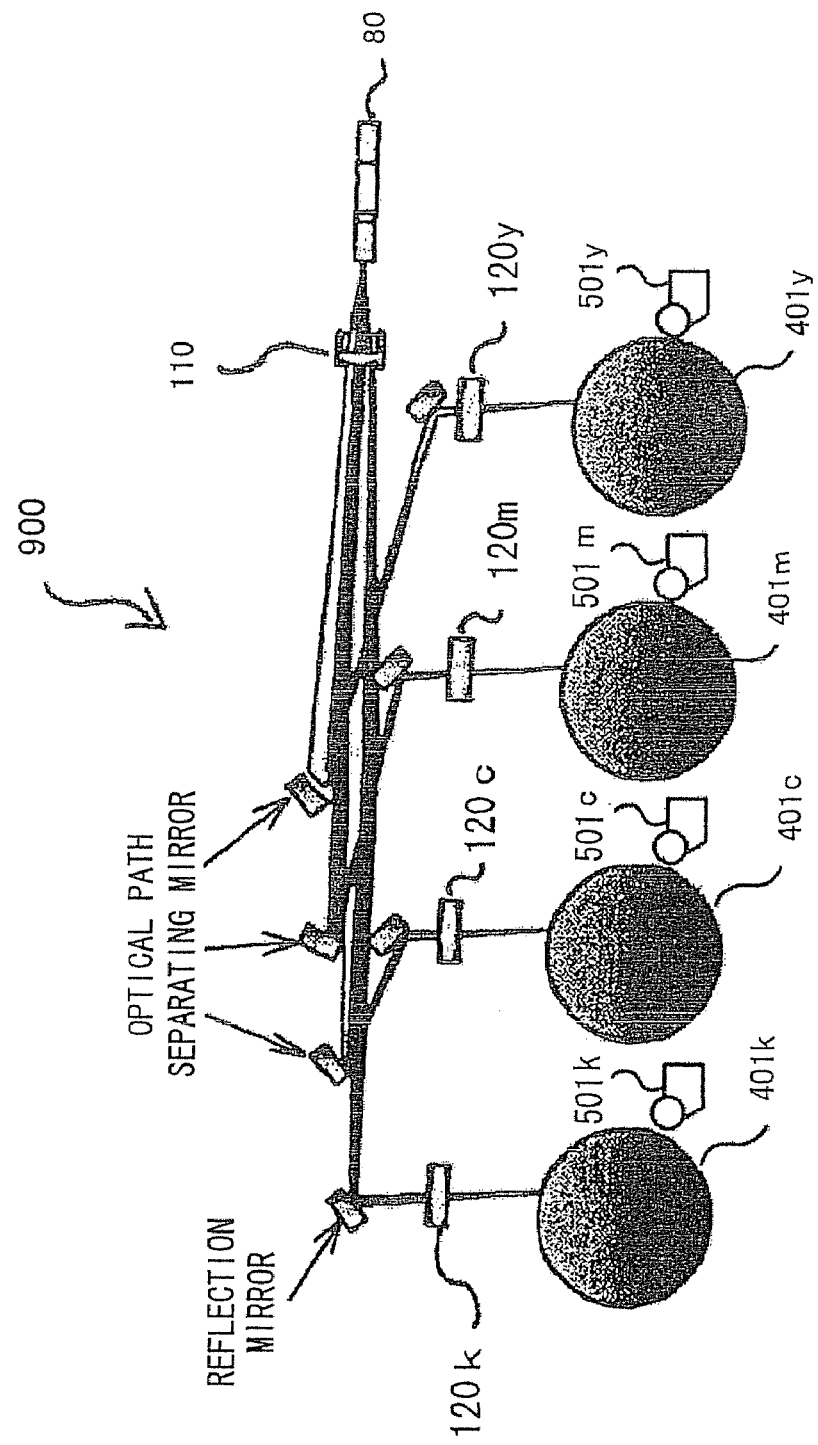
FIG. 5 is a view showing an example of the post-deflection optical system A' in which the common optical element is constructed of the one fθ lens 110.

Incidentally, in FIG. 1 and FIG. 3, although the structure in which the common optical element includes the two fθ lenses is shown, no limitation is made to this, and the common optical element can be constructed of one fθ lens. FIG. 4 and FIG. 5 are views showing an example of a post-deflection optical system A' in which a common optical element is constructed of one fθ lens 110. The structure shown in FIG. 4 and FIG. 5 further includes cylinder lenses 120y to 120k having positive powers, which are provided on optical paths between the common optical element and respective photosensitive bodies correspondingly to the photosensitive bodies 401y to 401k, and in which the incident surface sides are convex surfaces.

The power distribution of the fθ lens 110 in the structure shown in FIG. 4 and FIG. 5 is set to be the power distribution to give such a power that with respect to all light fluxes reflected and deflected by a polygon mirror 80 and guided to the plural photosensitive bodies 401y to 401k (all light fluxes incident from plural pre-deflection optical systems having different angles in the sub-scanning direction and heights, and reflected and deflected), in cooperation with the cylinder lenses 120y to 120k acting on the light beams guided to the individual photosensitive bodies, the light fluxes guided to the photosensitive surfaces by the post-deflection optical system A have specified optical characteristics (for example, characteristics to satisfy specified conditions as to the beam diameter of the light flux, the degree of bending of the scanning line, the position of the light flux to the scanning range, and the like) on the photosensitive surfaces according to the incident positions of the light fluxes. Incidentally, as shown in the drawing, it is preferable that a diffraction grating having a power in the sub-scanning direction is formed on an outgoing surface 110k of the fθ lens 110 (the effect of the diffraction grating will be described later).

As stated above, when the common optical element is constructed of the one lens, as compared with the structure using plural fθ lenses, the number of parts of the optical system can be reduced, and this can contribute to the reduction in cost.

Next, the common optical element in the post-deflection optical system A of the optical beam scanning device (see FIG. 1 and FIG. 3) according to the embodiment will be described in detail.

A diffraction grating is formed on a light flux outgoing surface 112k of the fθ2 lens 112.

The fθ2 lens 112 here is a plastic lens in which among plural optical elements constituting the post-deflection optical system, main light beams of the respective light fluxes from the plural light sources 71 are incident on incident positions different from each other in the sub-scanning direction orthogonal to the main scanning direction. Incidentally, the main light beams of the light fluxes incident on the fθ2 lens 112 from the respective light sources have only to be incident on the incident positions different from each other in the sub-scanning direction, and the structure may be such that one of the plural light fluxes passes along the optical axis of the post-deflection optical system and is incident. As stated above, the diffraction grating is formed on the optical element in which the light fluxes from the respective light sources are incident on the positions different from each other in the sub-scanning direction when viewed from the optical axis, so that the relative interval adjustment and angle adjustment between the respective light fluxes according to a temperature change becomes possible.

Incidentally, in the case where only one light flux from one light source is scanned, it is preferable that among plural optical elements constituting the post-deflection optical system A, the optical element on which the diffraction grating is to be formed is the fθ2 lens 112 as the optical element in which the main light beam of the light flux from the light source is incident on the incident position different from the optical path of the optical axis of the post-deflection optical system A in the sub-scanning direction orthogonal to the main scanning direction. Basically, since the outgoing angle can not be changed for the light flux incident along the optical axis, in order to perform the correction of color aberration according to the temperature change by the diffraction grating, it is necessary to make the light flux incident on the position different from at least the optical axis.

Besides, the diffraction grating formed on the outgoing surface 112k of the fθ2 lens 112 has the power in the sub-scanning direction, and by this, it is possible to suppress the occurrence of "lateral chromatic aberration" and "transverse chromatic aberration". Here, the "transverse chromatic aberration" corresponds to the chromatic aberration of magnification, and the "lateral chromatic aberration" corresponds to a chromatic aberration occurring in the optical axis direction (that is, the focal point or the position of an image point on an axis varies according to wavelength).

Incidentally, it is not necessary that the diffraction grating formed on the fθ2 lens 112 has always the power in the sub-scanning direction, and it may have the power only in the main scanning direction. As stated above, in the case where the diffraction grating formed on the fθ2 lens 112 is made the diffraction grating having the power only in the main scanning direction, it is possible to suppress the occurrence of the "lateral chromatic aberration" in the main scanning direction (defocus amount is reduced).

Of course, in view of the manufacturing cost and the number of steps, the diffraction grating formed on the fθ2 lens 112 may have a structure to give the power in both the main scanning direction and the sub-scanning direction.

Besides, the optical element on which the diffraction grating is formed is made the fθ2 lens 112 in which the incident surface and the outgoing surface are formed to be curved surfaces, so that the beam position and defocus are corrected (temperature compensated) according to the temperature change, and the wave aberration on the image surface can be improved. Of course, as long as desired optical characteristics in design can be realized, the lens surface may be plane.

Next, the details of the optical characteristics set on the diffraction grating formed on the fθ lens and the optical element 79 will be described.

Figure 6:
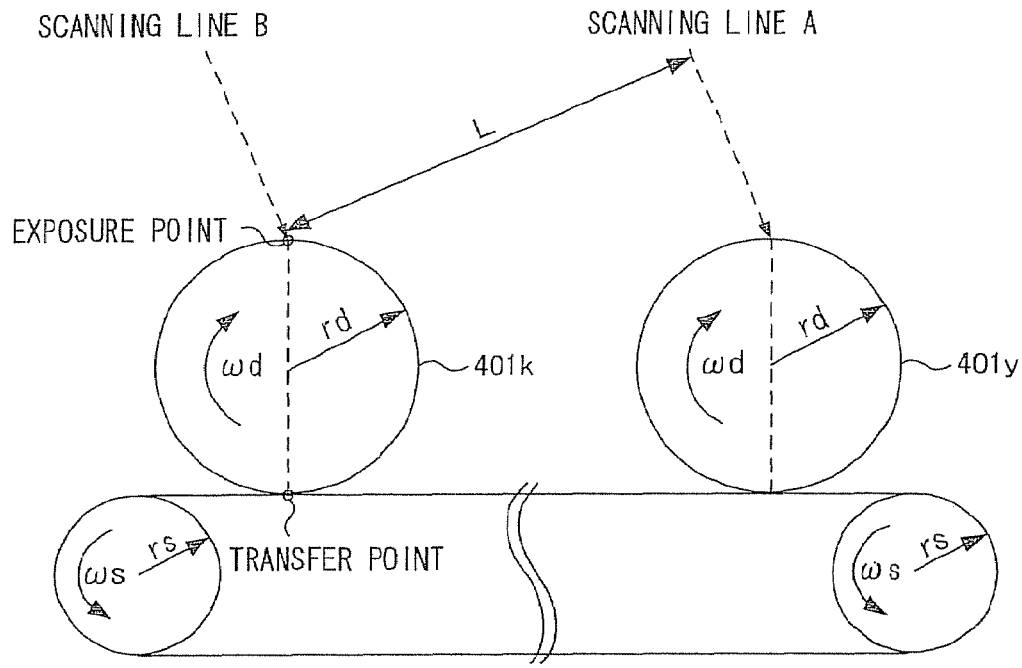
FIG. 6 is a view for explaining a registration shift in the image forming apparatus 900 caused by a change in environmental temperature.
Figure 7:
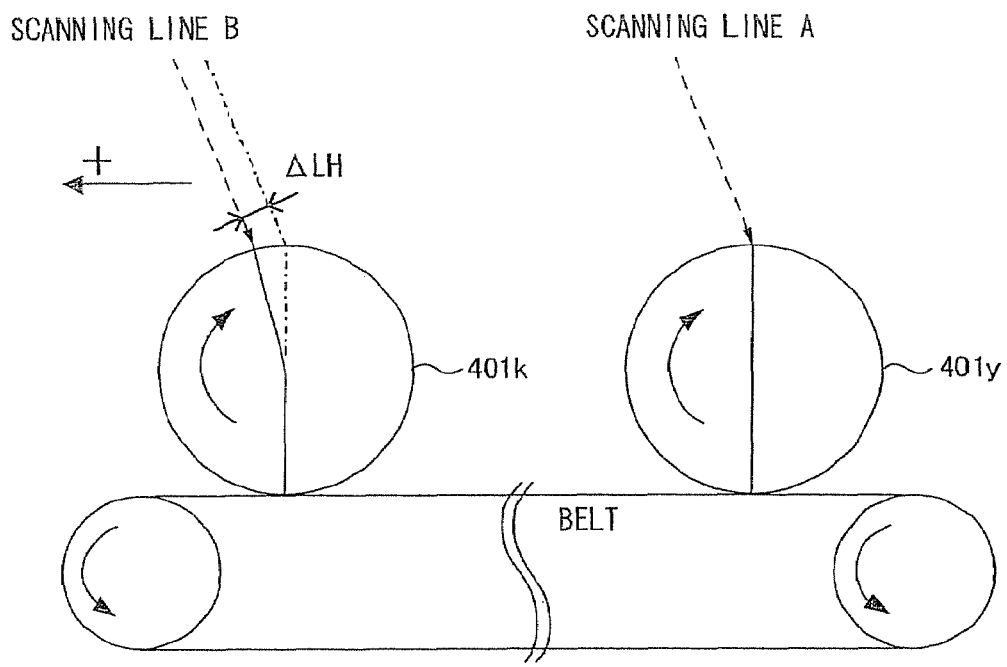
FIG. 7 is a view for explaining the registration shift in the image forming apparatus 900 caused by the change in environmental temperature.
Figure 8:
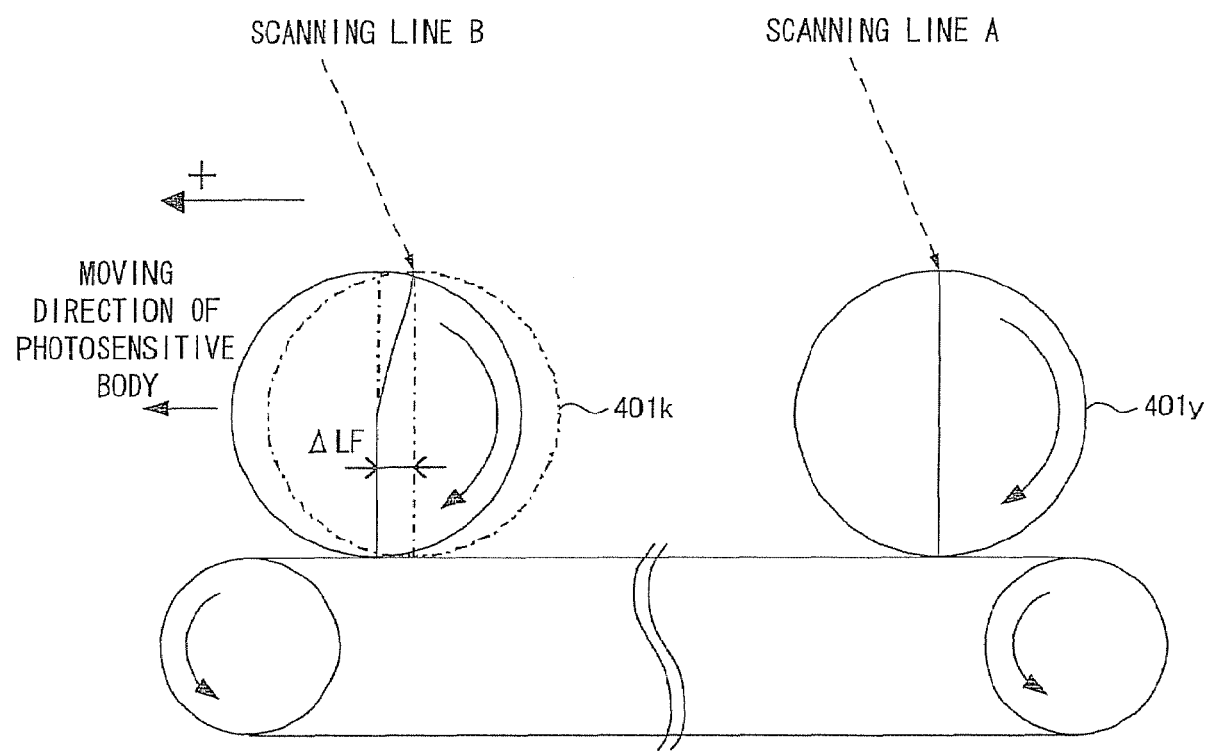
FIG. 8 is a view for explaining the registration shift in the image forming apparatus 900 caused by the change in environmental temperature.

FIG. 6 to FIG. 8 are views for explaining a registration shift in the image forming apparatus 900 caused by the change in environmental temperature. Incidentally, in FIG. 6 to FIG. 8, the description will be made while using the positional relation between the photosensitive bodies 401k and 401y as an example.

Here, in FIG. 6 to FIG. 8, when
an interval between light beams: L,
a radius of the photoconductive drum: $r_d$,
a rotation speed of the photoconductive drum: $\omega_d$,
a radius of a transfer belt drive shaft: $r_s$,
a rotation angular velocity of the transfer belt drive shaft: $\omega_s$, and
an angle between a straight line defining the interval between the light beams and a straight line connecting the drums: $\gamma$, the relation of expression (1) set forth below is established.

$$r_d \times \omega_d = r_s \times \omega_s = v \quad (1)$$

Here, in order to superimpose images at the same place, light exposure is performed while providing a time difference of $$T = L/\cos\gamma/(r_s \times \omega_s) \quad (2)$$

between the writing timing of a scanning line A and the writing timing of a scanning line B.

First, the influence of variation of the position of the scanning line will be considered.

When the interval between the light beams is shifted by $\Delta L_H$, the time when an image written on the photosensitive body by the scanning line B reaches the transfer point is delayed by $$\Delta T = \Delta L_H/\cos\gamma/v \approx \Delta L_H/\cos\gamma/v \quad (3)$$

(see FIG. 7).

When the positional relation of images formed on the belt is used for representation, the image formed by the scanning line B is shifted to the rear side (right side in FIG. 7) by $$v \times \Delta T \approx \Delta L_H/\cos\gamma \quad (4).$$

Next, the influence of variation of the position of the photosensitive body will be considered.

When the interval between the photosensitive bodies is shifted by $\Delta L_F$, the time when the image written by the scanning line B reaches the transfer point is delayed by $$\Delta T = -\Delta L_F/v \quad (5).$$

By this influence, the image by the scanning line B is shifted to the rear side (left side in FIG. 8) by $$v \times \Delta T = -\Delta L_F \quad (6)$$

(since the sign is minus, the image by the scanning line B is shifted by ΔLD to the left). Since the transfer point is also shifted to the left by $\Delta L_F$, the image by the scanning line B is shifted to the rear side (right side in FIG. 8) in total by $$-2 \times \Delta L_F \quad (7)$$

(since the sign is minus, the image by the scanning line B is shifted to the left by $2 \times \Delta L_F$).

Next, the influence of variation of the shaft diameter will be considered.

When the shaft diameter becomes large by $\Delta r_s$, v becomes fast by $\Delta r_s \omega_s$. Thus, a distance by which the belt (or a medium conveyed on the belt) advances in the same time T becomes large by $$\Delta r_s \omega_s T = \Delta r_s/r_s \times L/\cos\gamma \quad (8).$$

The image by the scanning line B is shifted to the rear side (right side in FIG. 8) by $$\Delta r_s/r_s \times L/\cos\gamma \quad (9).$$

In order to consider all the influences of "variation of position of scanning line", "variation of position of photosensitive body" and "variation of shaft diameter", when the expressions (4), (7) and (9) are added together, there occurs a shift of $$\Delta L_H/\cos\gamma - 2 \times \Delta L_F + \Delta r_s/r_s \times L/\cos\gamma \quad (10).$$

When the composite linear expansion coefficients (composite thermal expansion coefficients) of the housing in the image forming apparatus 900, the frame to support the respective photosensitive bodies and to regulate the positional relation between the respective photosensitive bodies, and the drive shaft to drive the belt are made $\alpha_H$, $\alpha_F$ and $\alpha_S$, and the rise temperature is made t, $$\Delta L_H = \alpha_H \times L \times t \quad (11)$$

$$\Delta L_F = \alpha_F \times L \times t / \cos \gamma \quad (12)$$

$$\Delta r_s = \alpha_S \times r_s \times t \quad (13),$$

and when these expressions (11) to (13) are substituted into the expression (10), a shift of $$\alpha_H \times L \times t / \cos \gamma - 2 \times \alpha_F \times L \times t / \cos \gamma + \alpha_S \times r_s \times t / r_s \times L / \cos \gamma = (\alpha_H - 2 \times \alpha_F + \alpha_S) / \cos \gamma \times (L \times t) \quad (14)$$

is obtained (the plus indicates the rear side (right side in FIG. 8)).

In order to cancel this by the position of the scanning line B, as is apparent from the expression (4), the scanning line B has only to be moved by the distance with the same absolute amount as the expression (14) and with the opposite sign. That is, $$-(\alpha_H - 2 \times \alpha_F + \alpha_S) \times (L \times t) \quad (15).$$

This means that a pitch between beams is made $-(\alpha_H - 2 \times \alpha_F + \alpha_S) \times (L \times t)$. That is, when the beam position is not fixed but is moved by the amount represented by the expression (15), even in the case where the temperature change occurs, a shift on the image does not occur.

Under the assumption as stated above, the expansion of the optical housing and the variation of the interval between the scanning lines caused by the thermal expansion of the optical housing become just equal to each other in the case where the pitch between the beams in the sub-scanning direction is expanded by $\alpha_H \times LB \times t$ (where, LB is an interval between sub-scanning beam positions on the image surface at the time when the optical path reflection from the deflection surface to the image surface is developed).

Thus, at the time when the reflection mirror is developed, when the beam position on the surface to be scanned can be shifted by $$-(\alpha_H - 2 \times \alpha_F + \alpha_S) \times (L \times t) + \alpha_H \times LB \times t \quad (16)$$

the occurrence of color superimposition shift due to the temperature change can be prevented, and the color shift amount at the time when the registration control is not performed can be suppressed. Besides, a time interval in which the registration control is performed can be made long.

Here, when the composite linear expansion coefficients (composite thermal expansion coefficients) of the housing to support plural optical elements constituting the optical beam scanning device in the image forming apparatus 900, the frame to support the respective photosensitive bodies and to regulate the positional relation between the respective photosensitive bodies, and the drive shaft to drive the belt are made $\alpha_H$, $\alpha_F$ and $\alpha_S$, the rise temperature is made t, and the pitch between scanning lines is made L, in the case where the temperature rises by t degrees, there occurs a shift of $$(\alpha_H - 2 \times \alpha_F + \alpha_S) \times (L \times t) \quad (17).$$

By adopting the structure of this embodiment, when the beam position on the surface to be scanned at the time when the folding mirror is developed is shifted according to the temperature change by $$-(\alpha_H - 2 \times \alpha_F + \alpha_S) \times (L \times t) + \alpha_H \times LB \times t \quad (18),$$

the occurrence of the color superimposition shift due to the temperature change can be prevented, the color shift amount in the case where the registration control is not performed can be suppressed, and the frequency at which the registration control is performed can be reduced.

Next, the function of the optical element 79 arranged in the pre-deflection optical system will be described specifically.

In general, when the environmental temperature rises, there is a tendency that the absolute value of the power of each optical element becomes small by the effect that the size of a member or an optical part is increased by the thermal expansion and the effect that the refractive index of a lens material is decreased.

With respect to the defocus, in the fθ lens, there is a problem that when the temperature rises, by the effects that the size of the lens itself becomes large and the refractive index of the lens material becomes small, the power in the sub-scanning direction having the positive power becomes small, and the imaging position is shifted in the direction of going away from the fθ lens. With respect to this, the optical element 79 is arranged in the pre-deflection optical system, so that the absolute value of the power becomes small, the imaging position can be shifted in the direction of approaching the fθ lens, and the occurrence of the defocus due to the temperature change can be suppressed.

In order to correct the defocus, which is caused by the correction by the diffraction grating provided in the post-deflection optical system, by the optical element 79 provided in the pre-deflection optical system, it is necessary that the diffraction grating provided in the post-deflection optical system and the optical element 79 provided in the pre-deflection optical system have powers at least in the same direction.

As stated above, in this embodiment, the interval between the beams on the image surface in the sub-scanning direction is changed by the diffraction grating provided in the post-deflection optical system A so as to correct the color superposition shift due to the thermal expansion of the image forming apparatus according to the temperature change, and the defocus in the sub-scanning direction caused by the power distribution of the optical system optimized to the position correction after the deflection is corrected by the optical element 79 provided in the pre-deflection optical system 7. Besides, the optical element 79 in this embodiment is arranged such that the light flux incident on the optical element 79 passes along the optical axis of the optical element 79, so that the optical path is not changed when the adjustment of the defocus is performed.

Of course, the power is given to the diffraction grating provided in the post-deflection optical system A only in the main scanning direction, and the power is given also to the optical element 79 provided in the pre-deflection optical system 7 only in the main scanning direction, and while the occurrence of the "lateral chromatic aberration" in the main scanning direction is suppressed by the diffraction grating formed on the fθ2 lens 112, the length of the scanning line can also be corrected by the optical element 79.

Next, the effect of providing the diffraction grating on the fθ lens in the post-deflection optical system will be examined. Here, an equivalent to an Abbe number defined from a refractive index at the time when temperature is changed by ±15 degrees and a value of wavelength change of a laser diode is as follows.

<Value of Refractive Lens>

$$\nu = (n(\text{refractive index at 25 degrees}) - 1) / (n(\text{refractive index at 10 degrees}) - n(\text{refractive index at 45 degrees})) = 166.3609 \quad (19)$$

<Value of diffractive lens> (in the case where an LD of 780 nm is used, and the wavelength of irradiation light becomes long by 0.28 nm when temperature rises by 1 degree)

$$\nu = \lambda(\text{wavelength at 25 degrees})/(\lambda(\text{wavelength at 10 degrees}) - \lambda(\text{wavelength at 45 degrees})) = -92.8571 \quad (20)$$

Here, the signs of the values of the refractive lens and the diffractive lens are opposite to each other, and this means that for example, in the refractive lens, when the temperature rises, the absolute value of the power is decreased, while in the diffractive lens, when the temperature rises, the absolute value of the power is increased. By this, it is understood that the defocus and the change of beam position based on the temperature change can be controlled to some extent by the power distribution of the refractive lens and the diffractive lens.

EXAMPLE

Next, specific examples of the invention will be described. In the respective examples described below, a description will be given to examples in which the optical system has the structure including two fθ lenses shown in FIG. 1 and FIG. 3.

In the case where
material of an optical system housing: alumina die casting (linear expansion coefficient $\alpha_H = 2.1 \times 10^{-5}$),
material regulating an interval between photosensitive bodies: alumina die casting (linear expansion coefficient $\alpha_F = 2.1 \times 10^{-5}$),
material of a drive shaft of a transfer belt: alumina die casting (linear expansion coefficient $\alpha_s = 2.1 \times 10^{-5}$),
interval between light beams incident on photosensitive bodies (photosensitive body 401k and photosensitive body 401y) at both ends: L=225 mm, and
temperature rise: t=15 degrees,
an ideal change amount of distance between beams at both ends in the sub-scanning direction is $$-(\alpha_H - 2 \times \alpha_F + \alpha_s) \times (L \times t) + \alpha_H \times LB \times t = 0 + 0.007 = 0.007 \quad (21)$$

(this means that in the case where the temperature change occurs, when the position of the light beam in the sub-scanning direction is not shifted at all, a color superposition shift of 7 μm/cos γ occurs).

Figure 9:
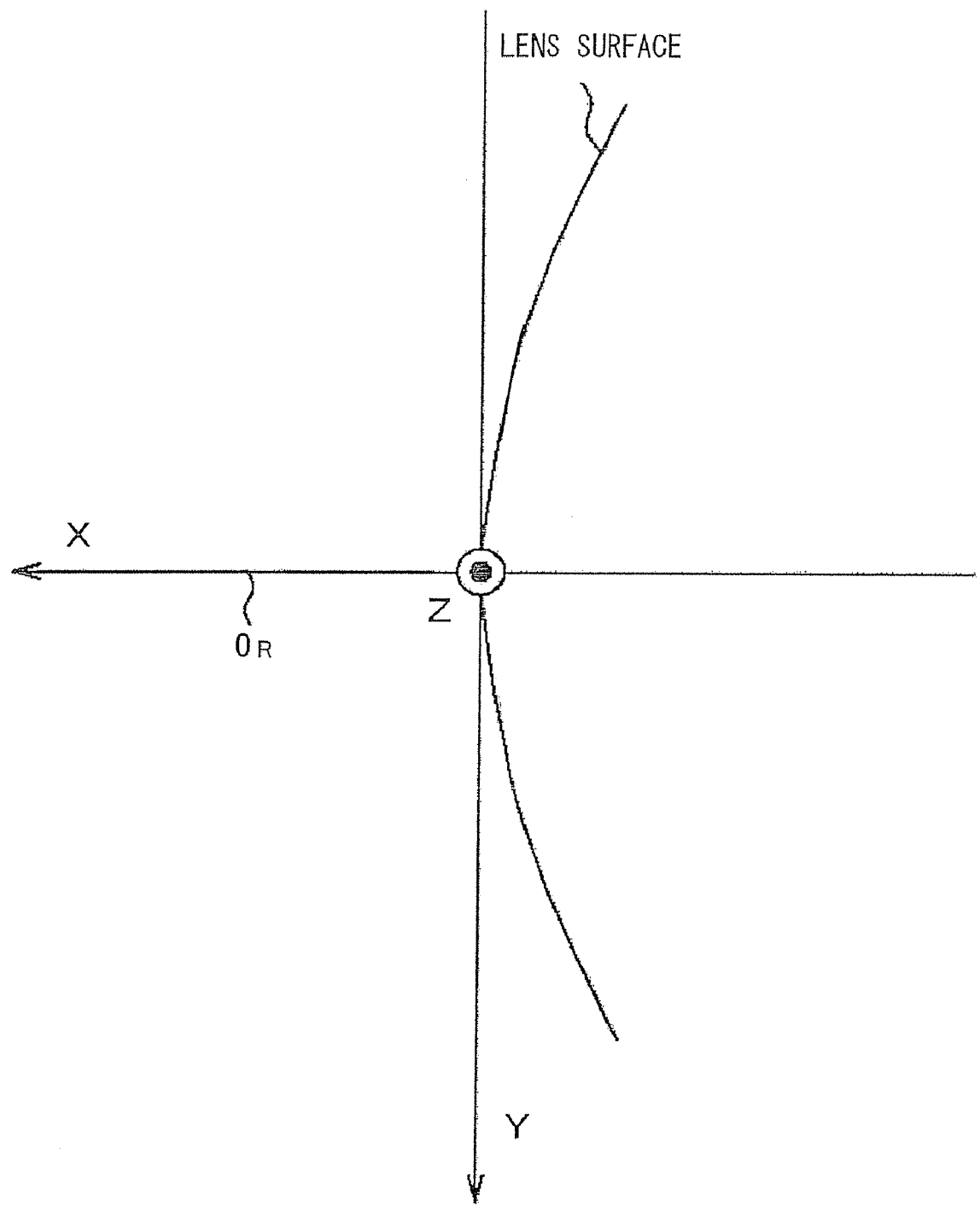
FIG. 9 is a view showing an example of a coordinate system for defining the shape of a lens surface.

In the case where the shape of a lens surface is represented by the coordinate system as shown in FIG. 9, the shape of the refractive lens surface of each optical element is represented by, for example, a shape definition expression as shown in FIG. 10. In the definition expression shown in the drawing, ay=1 and az=1 are adopted in this example.

Besides, an optical path difference function is represented by the following polynomial.

$$\Phi = \Sigma c_{lm} x y^l x z^m \quad (22)$$

Figure 16:
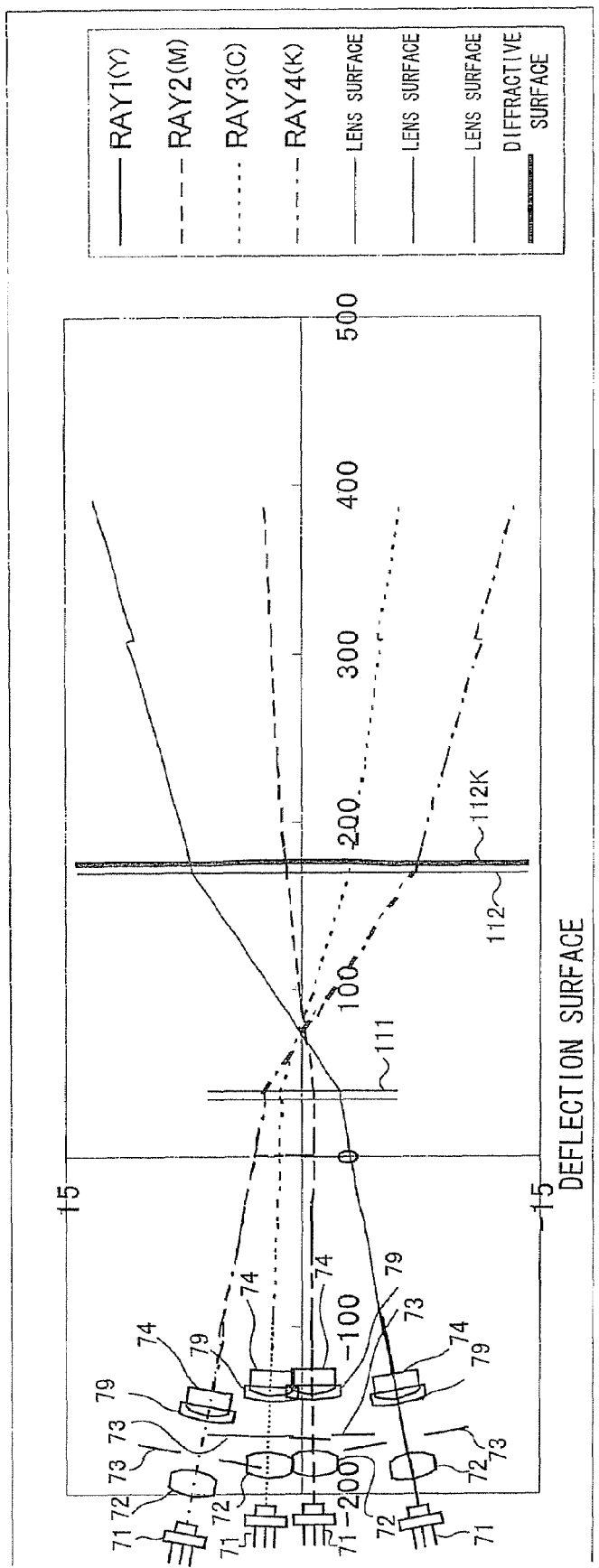
FIG. 16 is a view showing main light beams of respective plural light fluxes emitted from plural light sources 71 and sections, in a sub-scanning direction, of an optical element 79, a cylinder lens 74, an fθ1 lens and an fθ2 lens in which a diffraction grating surface is added to an outgoing surface side.

FIG. 11 is a view showing optical design data of each optical element in the example of the invention, FIG. 12 is a data table showing the paraxial power of each optical element, FIG. 13 is a data table showing an eccentricity amount and an inclination of each optical element in the example, FIG. 14 is a data table of coefficient values, FIG. 15 is a view showing a coefficient table of an optical path difference function, and FIG. 16 is a view (view enlarged in the sub-scanning direction) showing main light beams of respective plural light fluxes emitted from plural light sources 71 and sections, in the sub-scanning direction, of an optical element 79, a cylinder lens 74, an fθ1 lens and an fθ2 lens 112 in which a diffraction grating surface is added to an outgoing surface side.

In the optical beam scanning device of the example, as described above, the lens having the power in which the dispersion becomes positive and the diffraction optical element with the negative dispersion are provided in the post-deflection optical system A, so that the power distribution is optimized. By this, it becomes possible to expand the adoptable range of the chromatic aberration of magnification of the post-deflection optical system A in the sub-scanning direction.

An optical characteristic of each optical element in the optical beam scanning device of the example is set so that by optimizing the chromatic aberration of magnification of the post-deflection optical system A in the sub-scanning direction, the beam position on the surface to be scanned at the time when the reflection mirror is developed is shifted by $$-(\alpha_H - 2 \times \alpha F + \alpha S) \times (L \times t) + \alpha_H \times LB \times t \quad (23).$$

In the case where such structure is adopted, according to conditions, there is a case where a defocus change amount in the sub-scanning direction becomes large by the correction action of the beam position at the time of temperature change by the diffraction grating in the post-deflection optical system A. In order to correct this, the optical element 79 as the plastic lens having the power to cancel the amount of defocus caused in the post-deflection optical system A is provided in the pre-deflection optical system 7, and the power to cause the light to be condensed in the sub-scanning direction in the vicinity of the polygon mirror reflecting surface is given to the glass cylinder lens through the optical element 79.

As stated above, in this example, in the pre-deflection optical system 7, the main light beam of each light flux is guided to pass along the optical axis of each of the optical elements 79 corresponding to the respective colors, and in the post-deflection optical system A, the main light beam of the light flux is guided to pass through a position apart from the optical axis of the diffraction optical element (here, the fθ2 lens 112), and consequently, in the post-deflection optical system A, the correction is made so that the chromatic aberration of magnification due to the temperature change becomes a specified value, and the defocus caused by the correction in the post-deflection optical system A is corrected by the optical element 79 as the optical element having no influence on the light beam position on the image surface.

FIG. 17 is view for explaining the effect of the example.

As shown in FIG. 17, it is understood that a beam interval between RAY1 (light beam for Y) and RAY4 (light beam for K) is moved in a direction of widening by 11 μm by a temperature rise of 15 degrees. Since the movement is performed in the direction of canceling the registration shift amount (7 μm/cos γ) in the case where the beam does not move, even if the temperature rises by 15 degrees, only the color superposition shift of 4 μm/cos γ occurs between yellow and black.

With respect to the relation between RAY2 and RAY4, L=75×2=150 is obtained, and since the movement is performed by 1 μm in the direction of canceling the registration shift amount (5 μm/cos γ) in the case where the light beam does not move, the shift becomes 4 μm/cos γ, and also with respect to RAY3 and RAY4, L=75 is obtained, and since the movement is performed by 12 μm in the direction of canceling the registration shift amount (2 μm/cos γ) in the case where the light beam does not move, the shift can be suppressed to 10 μm/cos γ.

Further, the defocus change amount in the main scanning direction is suppressed to almost zero, and the defocus change amount in the sub-scanning direction is also suppressed to 0.4 or less (see FIG. 17).

The plastic lens for correction (optical element 79) which allows all light fluxes to pass through at specified intervals and has the negative power in the sub-scanning direction is disposed in the pre-deflection optical system, and the plastic lens (fθ2 lens 112) including the diffraction optical element surface having the power in the sub-scanning direction is arranged in the post-deflection optical system, so that the beam position in the sub-scanning direction can be changed so as to cancel the color shift caused by the thermal expansion of the image forming apparatus. Besides, even in the case where the pitch change amount between beams in the sub-scanning direction at the time of temperature rise is made small (in the case where when the temperature rises, the increase amount of the pitch between the beams in the sub-scanning direction is small or becomes small), the defocus change amount in the sub-scanning direction at the time of temperature rise can be sufficiently suppressed. As stated above, at least the optical element 79 and the fθ2 lens 112 are made of the same material, and consequently, in the case where there is a temperature change, both the lenses thermally expand in the same way, and the refractive indexes are also changed in the same way, and accordingly, the adjustment of the defocus caused by the correction by the diffraction grating of the fθ2 lens 112 is easily performed by the optical element 79.

Further, by performing the optimum optical power arrangement, it becomes possible to provide the optical system to reduce the temperature dependency of the imaging surface in the main scanning direction.

COMPARATIVE EXAMPLE

Next, a description will be given to a comparative example used for comparing the effect of the foregoing example with a conventional optical beam scanning device. In this comparative example, the optical element 79 is not provided in the pre-deflection optical system, and the diffraction optical element is not provided in the post-deflection optical system. FIG. 18 is a view showing optical design data of each optical element in the comparative example, FIG. 19 is a data table showing the paraxial power of a plastic lens arranged in a pre-deflection optical system in the comparative example, and FIG. 20 is a data table showing an eccentricity amount and an inclination of each optical element in the comparative example.

As shown in FIG. 21, in the structure of this example, RAY1 (light beam for Y) and RAY4 (light beam for black) are moved in the direction of widening by 90 μm by a temperature rise of 15 degrees. In an example of a combination of materials of a housing, a member to regulate an interval between photosensitive bodies, and a drive shaft of a transfer belt in the foregoing example, a registration shift amount in the case where a light beam is not moved is obtained by the following expression.

$$(-(\alpha_H - 2 \times \alpha_F + \alpha S) \times (L \times t) + \alpha_H \times LB \times t)/\cos \gamma = 0 + 5 = 5 \; \mu m / \cos \gamma \quad (24)$$

In addition, since the shift of 90 μm occurs in the same direction, a color superposition shift of 85 μm/cos γ occurs between yellow and black by the temperature rise of 15 degrees.

As stated above, in the case where the plastic lens having the negative power in the sub-scanning direction is not provided in the pre-deflection optical system, and the plastic lens including no diffractive surface having the positive power in the sub-scanning direction is provided in the post-deflection optical system, it is understood that the "color shift" and "defocus change amount" at the time of temperature rise can not be sufficiently suppressed.

Figure 22:
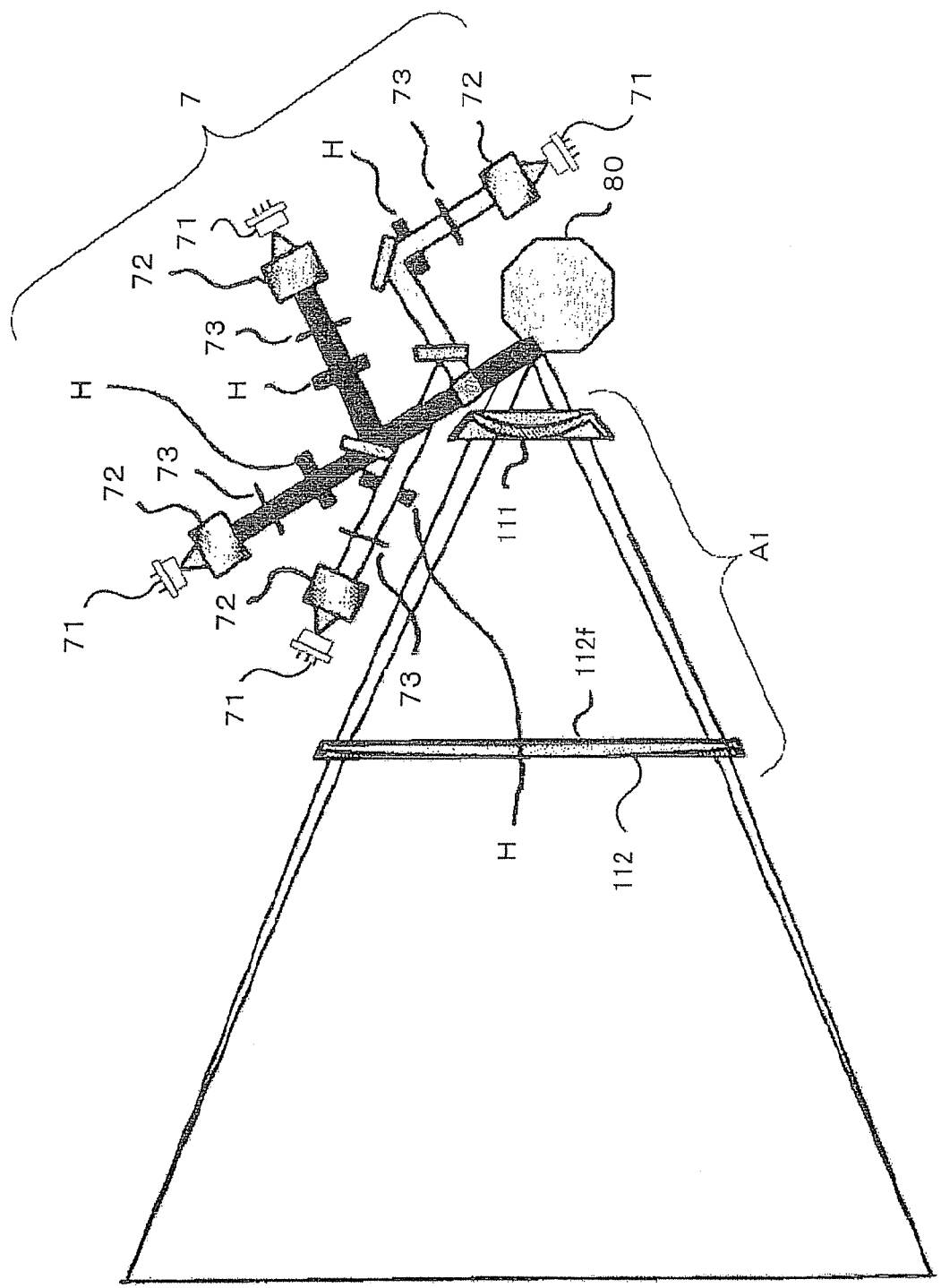
FIG. 22 is a view showing an example in which in an optical beam scanning device having a structure including two fθ lenses, a diffraction grating is formed on an incident surface 112f of an fθ2 lens 112.

FIG. 22 is a view showing an example in which in an optical beam scanning device having a structure including two fθ lenses, a diffraction grating is formed on an incident surface 112f of an fθ2 lens 112.

Figure 23:
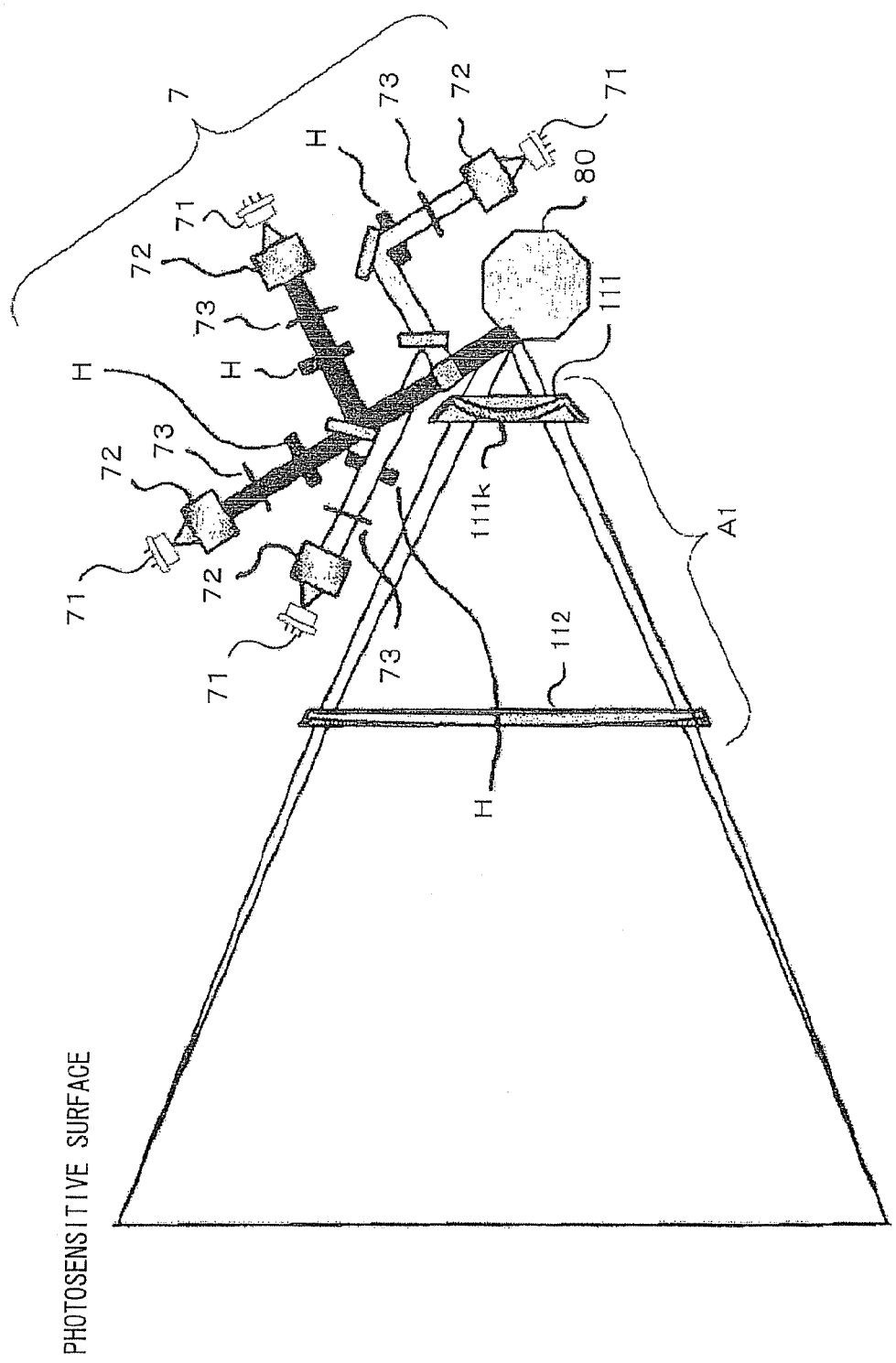
FIG. 23 is a view showing an example in which in an optical beam scanning device having a structure including two fθ lenses, a diffraction grating is formed on an outgoing surface 111k of an fθ1 lens 111.

FIG. 23 is a view showing an example in which in an optical beam scanning device having a structure including two fθ lenses, a diffraction grating is formed on an outgoing surface 111k of an fθ1 lens 111.

Figure 24:
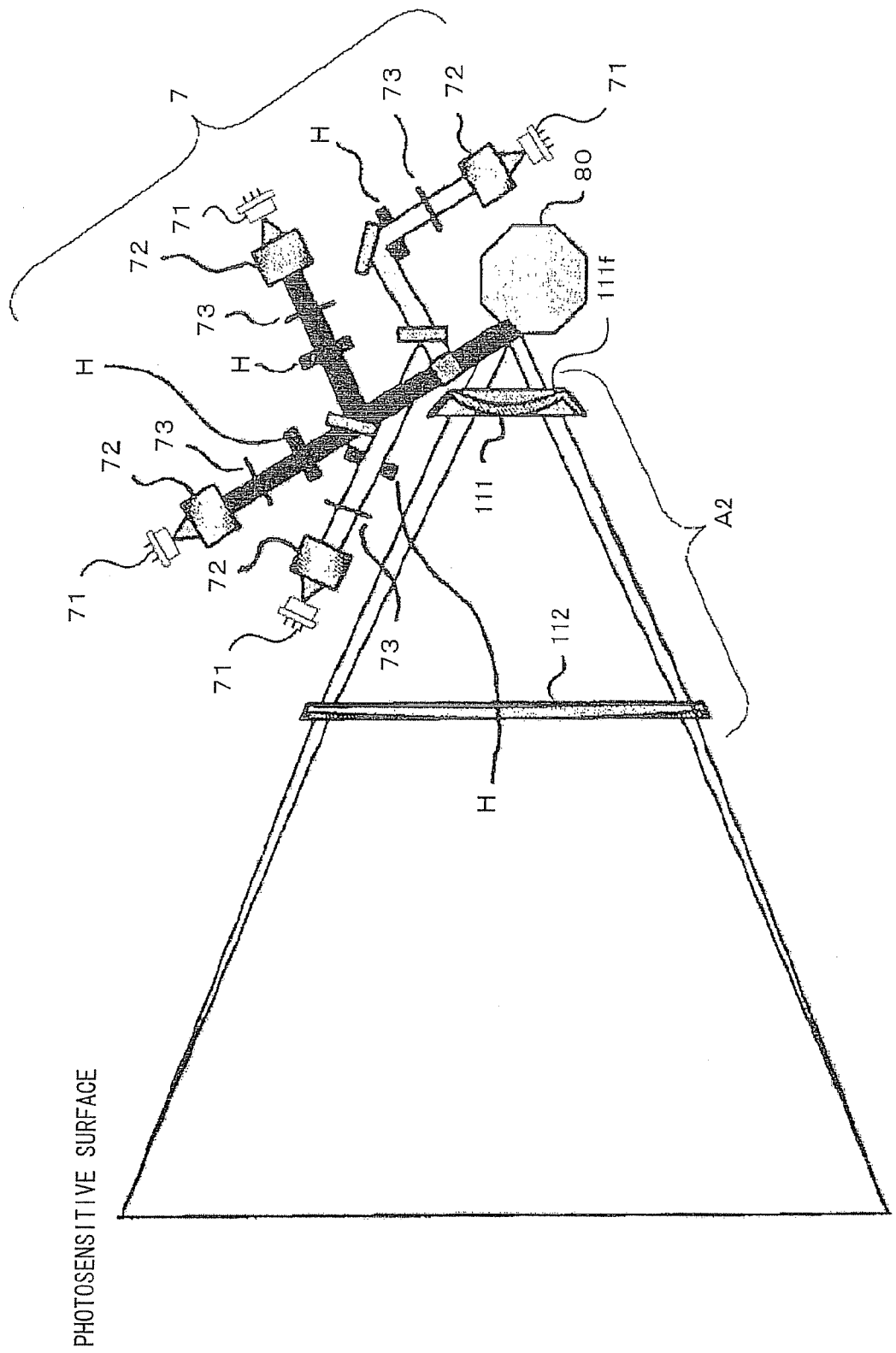
FIG. 24 is a view showing an example in which in an optical beam scanning device having a structure including two fθ lenses, a diffraction grating is formed on an incident surface 111f of an fθ1 lens 111.

FIG. 24 is a view showing an example in which in an optical beam scanning device having a structure including two fθ lenses, a diffraction grating is formed on an incident surface 111f of an fθ1 lens 111.

Figure 25:
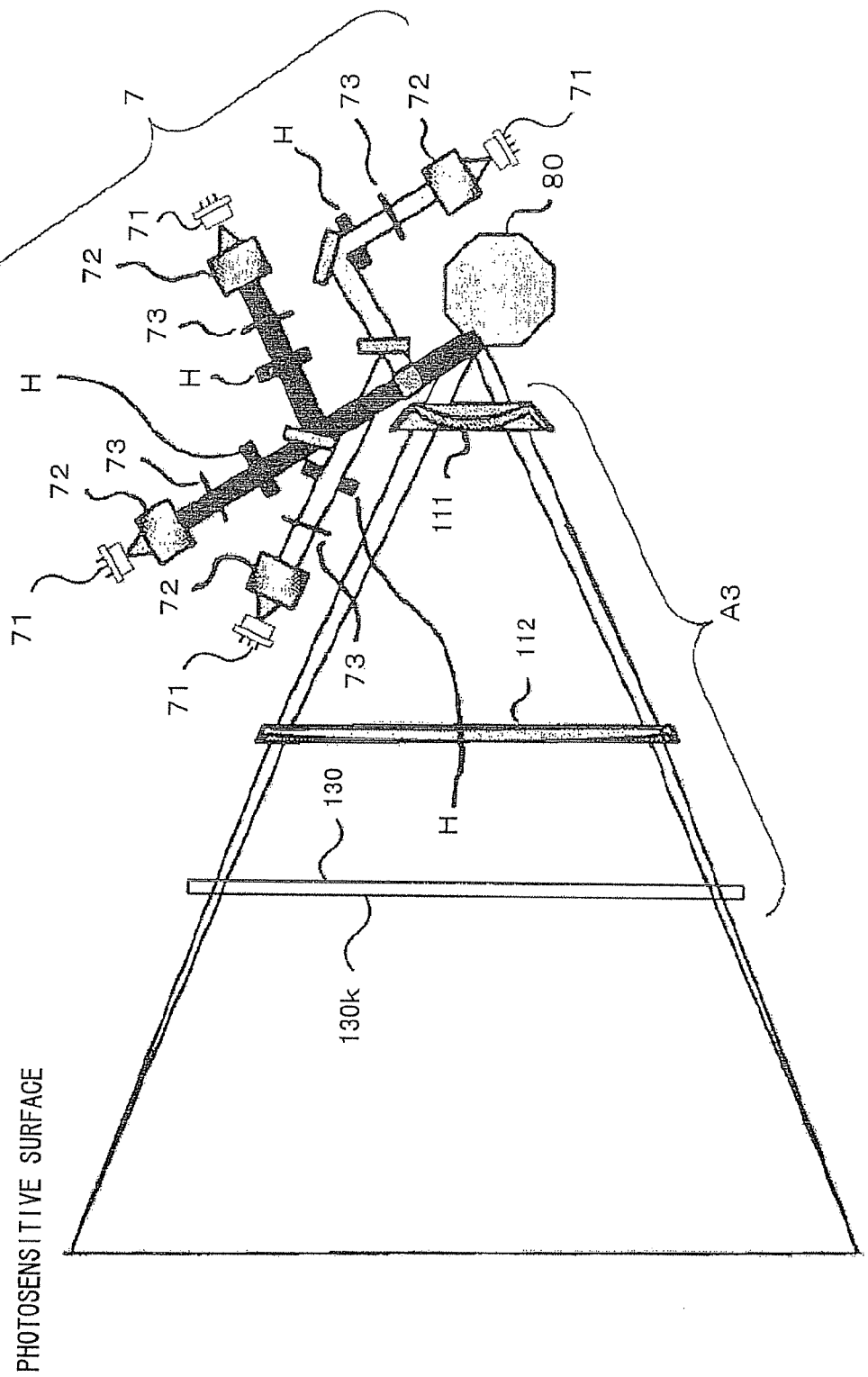
FIG. 25 is a view showing an example in which in an optical beam scanning device having a structure including two fθ lenses, a plate-like optical element 130 is arranged to be closer to a photosensitive surface side than an fθ2 lens 112.

FIG. 25 is a view showing an example in which in an optical beam scanning device having a structure including two fθ lenses, a plate-like optical element 130 is arranged to be closer to a photosensitive surface side than an fθ2 lens 112. In the drawing, a diffraction grating is formed on an outgoing surface 130k of the plate-like optical element 130.

Figure 26:
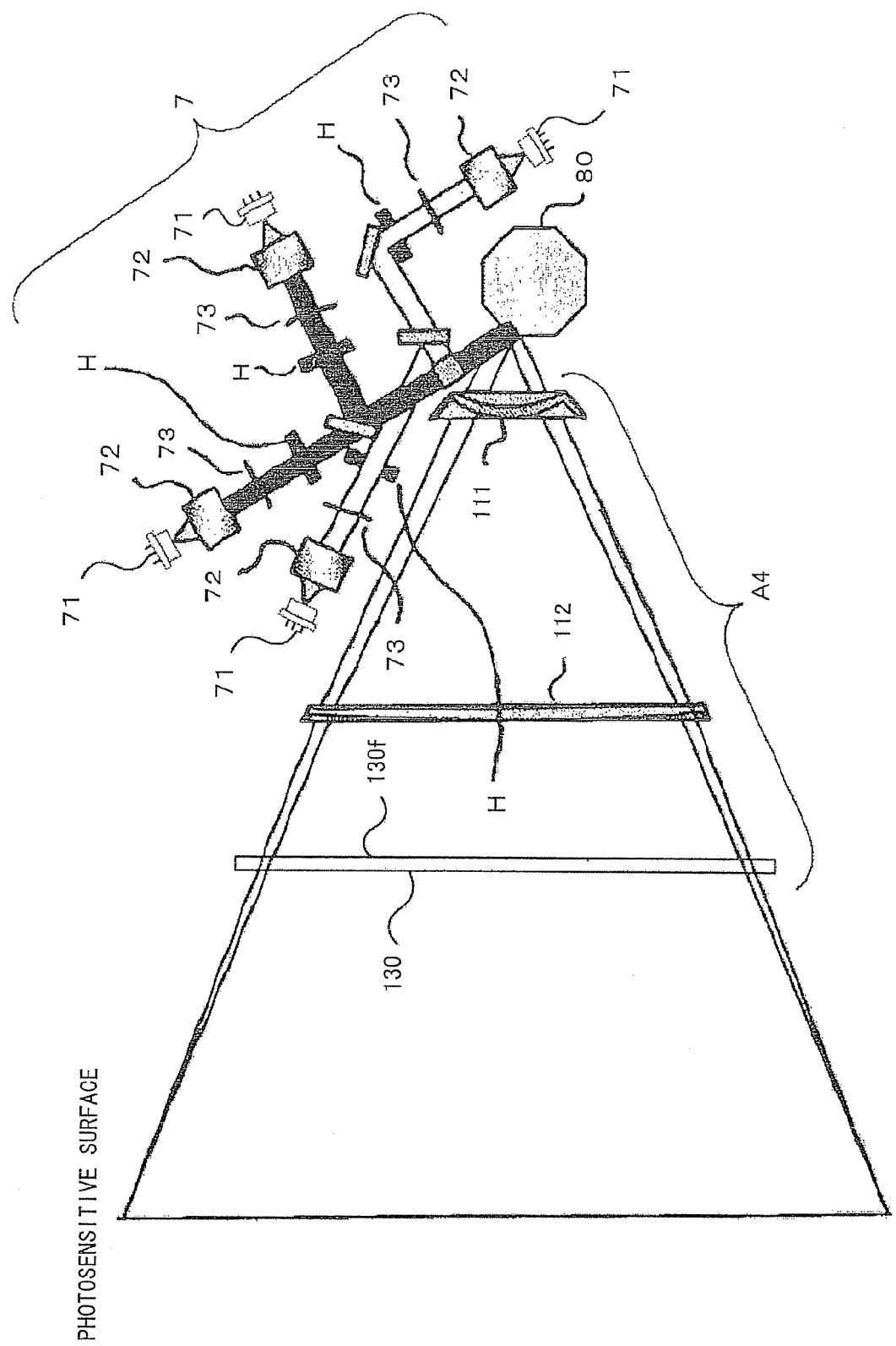
FIG. 26 is a view showing an example in which in an optical beam scanning device having a structure including two fθ lenses, a plate-like optical element 130 is arranged to be closer to a photosensitive surface side than an fθ2 lens 112.

FIG. 26 is a view showing an example in which in an optical beam scanning device having a structure including two fθ lenses, a plate-like optical element 130 is arranged to be closer to a photosensitive surface side than an fθ2 lens 112. In the drawing, a diffraction grating is formed on an incident surface 130f of the plate-like optical element 130. The plate-like optical element 130 in FIG. 25 and FIG. 26 gives a power to all light fluxes reflected and deflected by a polygon mirror 80 and guided to respective plural photosensitive bodies.

Figure 27:
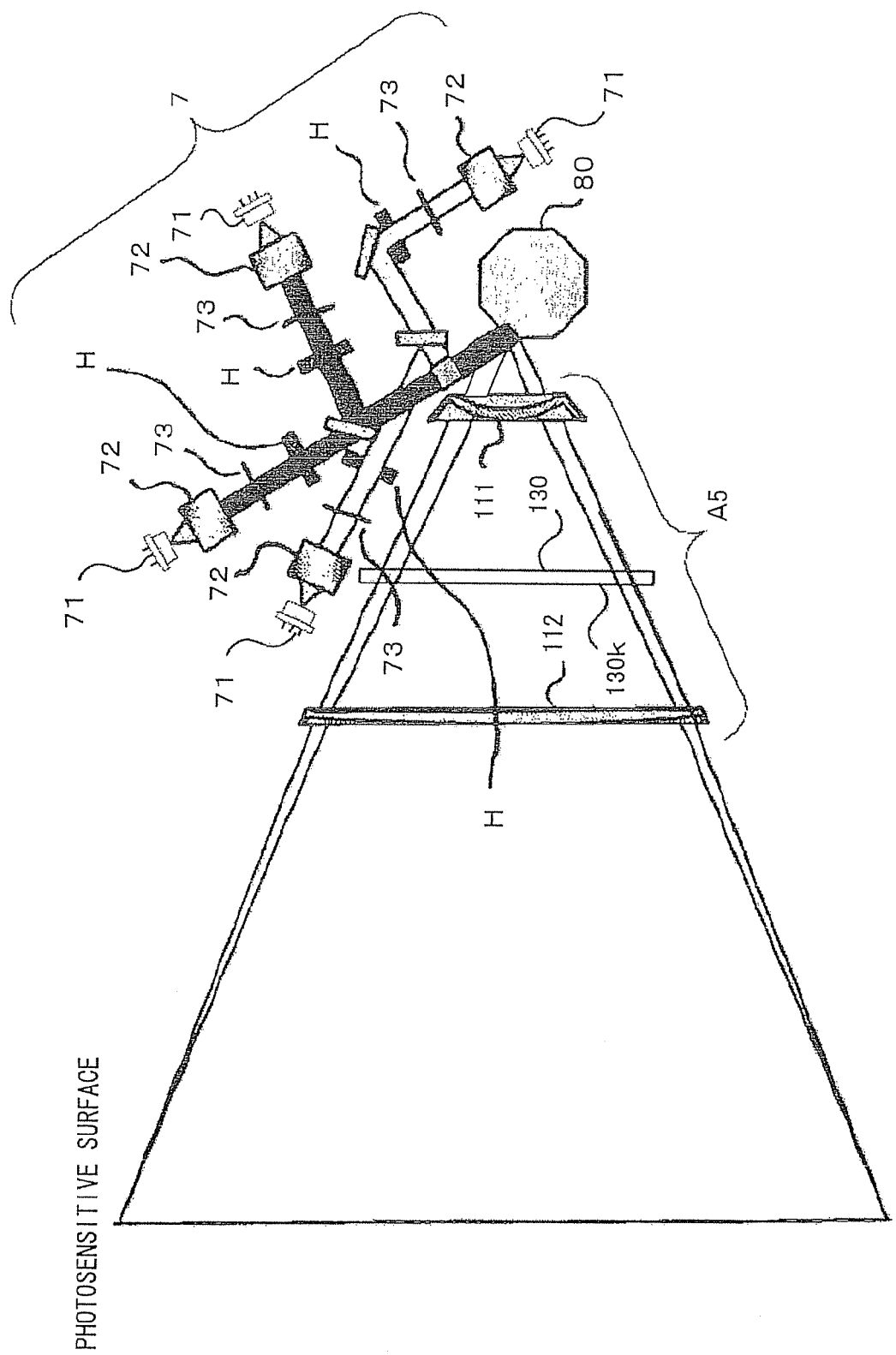
FIG. 27 is a view showing an example in which in an optical beam scanning device having a structure including two fθ lenses, a plate-like optical element 130 is arranged between an fθ1 lens 111 and an fθ2 lens 112.

FIG. 27 is a view showing an example in which in an optical beam scanning device having a structure including two fθ lenses, a plate-like optical element 130 is arranged between an fθ1 lens 111 and an fθ2 lens 112. In the drawing, a diffraction grating is formed on an outgoing surface 130k of the plate-like optical element 130.

Figure 28:
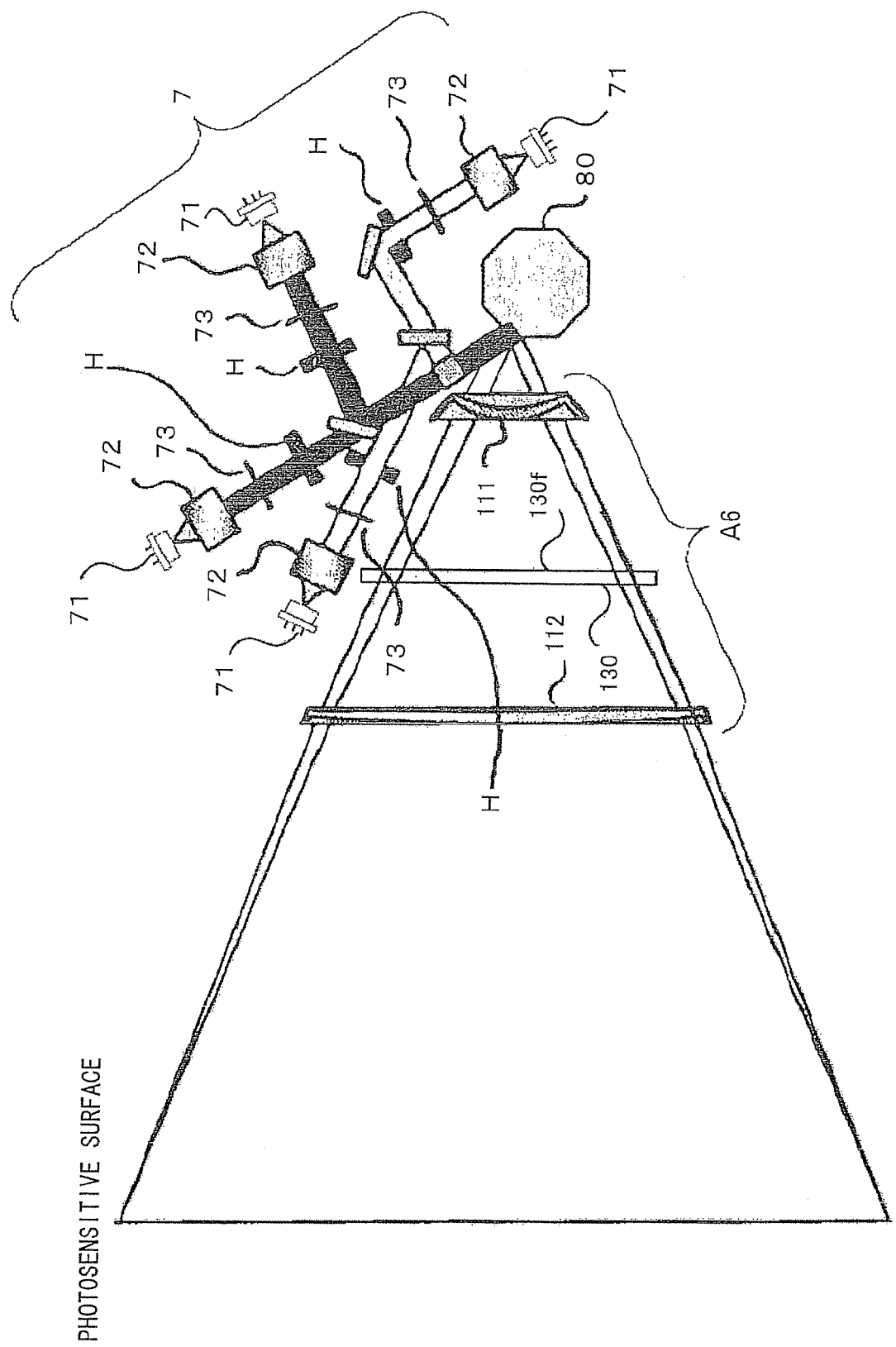
FIG. 28 is a view showing an example in which in an optical beam scanning device having a structure including two fθ lenses, a plate-like optical element 130 is arranged between an fθ1 lens 111 and an fθ2 lens 112.

FIG. 28 is a view showing an example in which in an optical beam scanning device having a structure including two fθ lenses, a plate-like optical element 130 is arranged between an fθ1 lens 111 and an fθ2 lens 112. In the drawing, a diffraction grating is formed on an incident surface 130f of the plate-like optical element 130.

Figure 29:
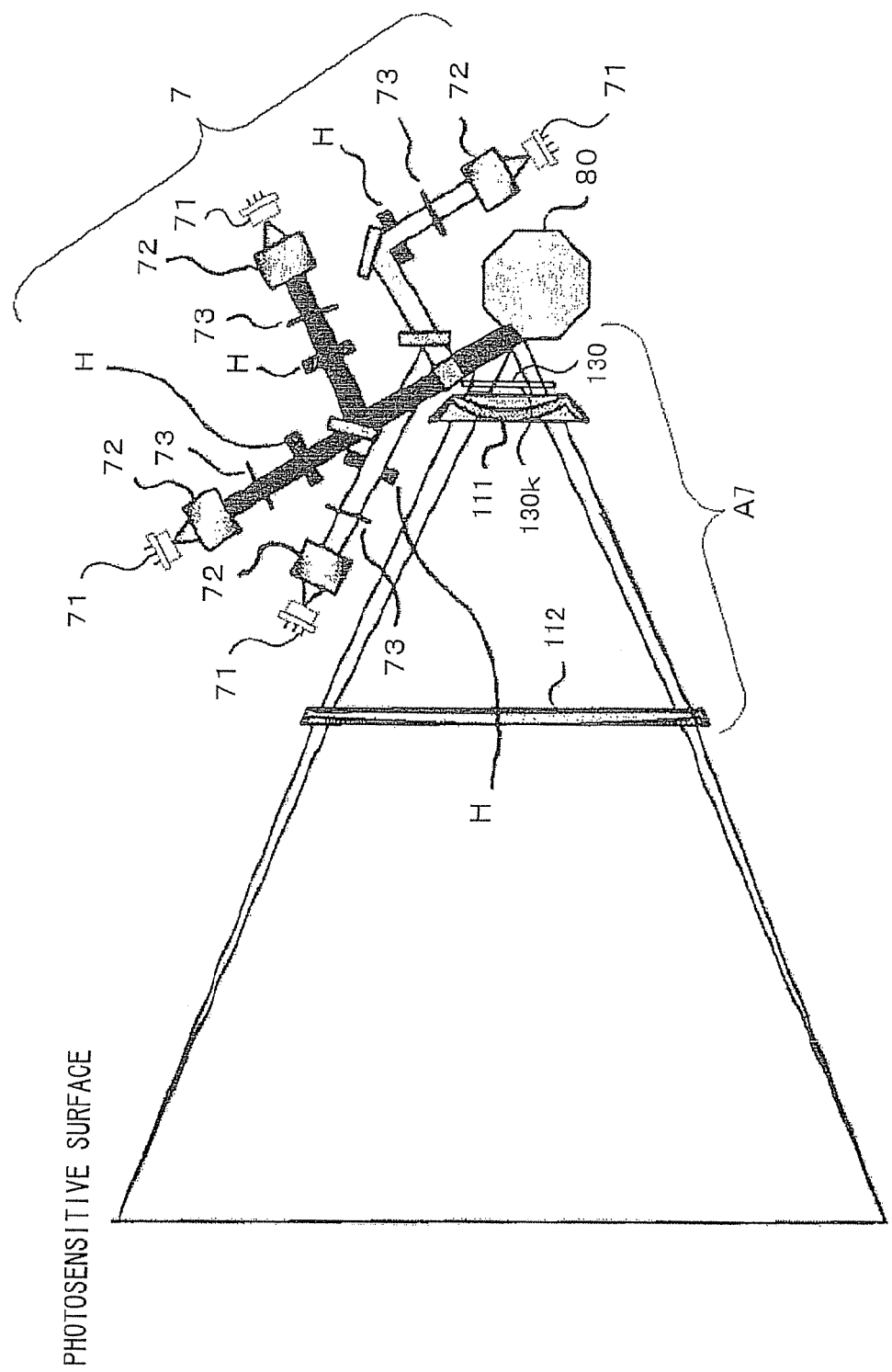
FIG. 29 is a view showing an example in which in an optical beam scanning device having a structure including two fθ lenses, a plate-like optical element 130 is arranged between an fθ1 lens 111 and a polygon mirror 80.

FIG. 29 is a view showing an example in which in an optical beam scanning device having a structure including two fθ lenses, a plate-like optical element 130 is arranged between an fθ1 lens 111 and a polygon mirror 80. In the drawing, a diffraction grating is formed on an outgoing surface 130k of the plate-like optical element 130.

Figure 30:
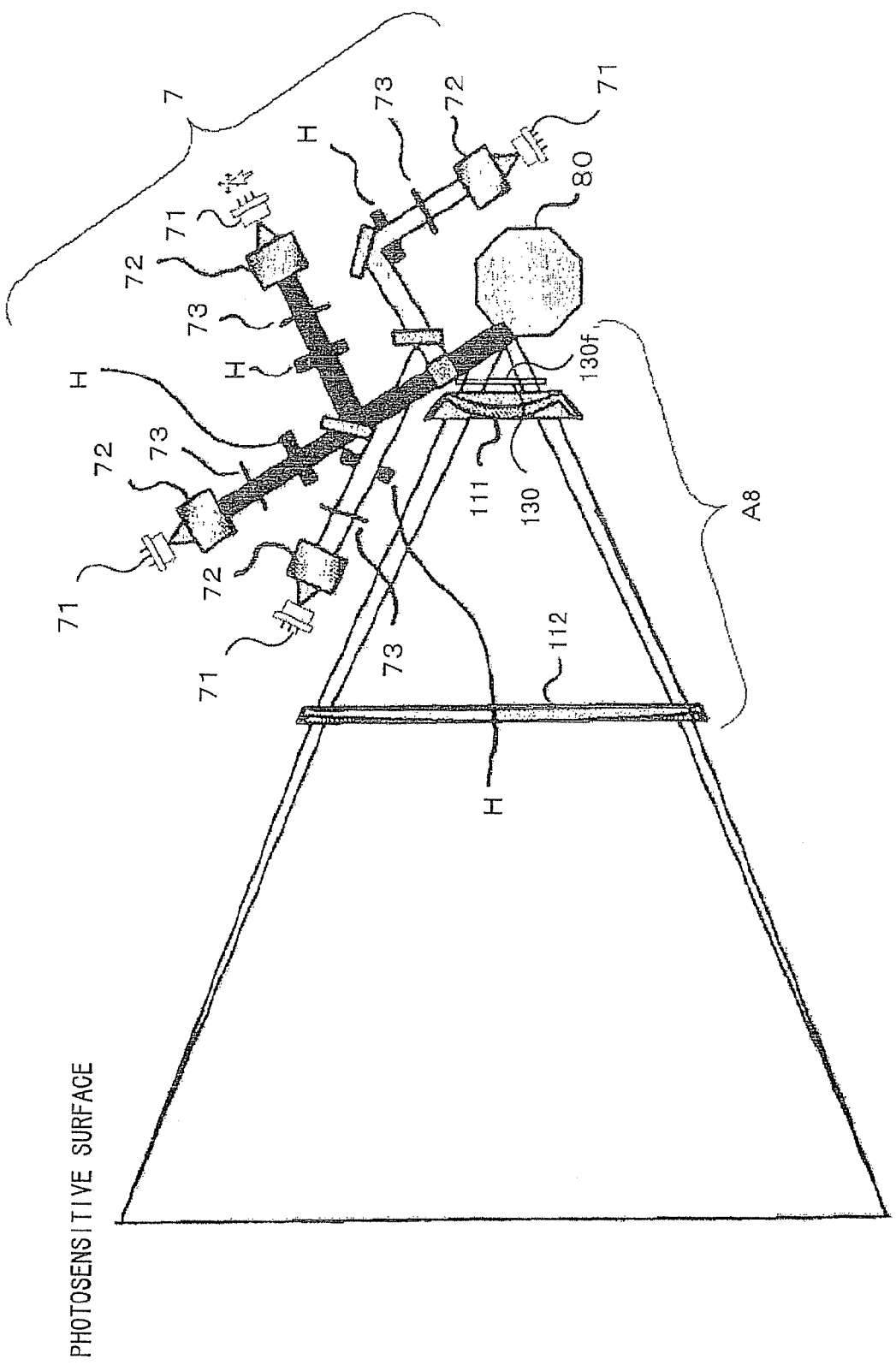
FIG. 30 is a view showing an example in which in an optical beam scanning device having a structure including two fθ lenses, a plate-like optical element 130 is arranged between an fθ1 lens 111 and a polygon mirror 80.

FIG. 30 is a view showing an example in which in an optical beam scanning device having a structure including two fθ lenses, a plate-like optical element 130 is arranged between an fθ1 lens 111 and a polygon mirror 80. In the drawing, a diffraction grating is formed on an incident surface 130f of the plate-like optical element 130.

Figure 31:
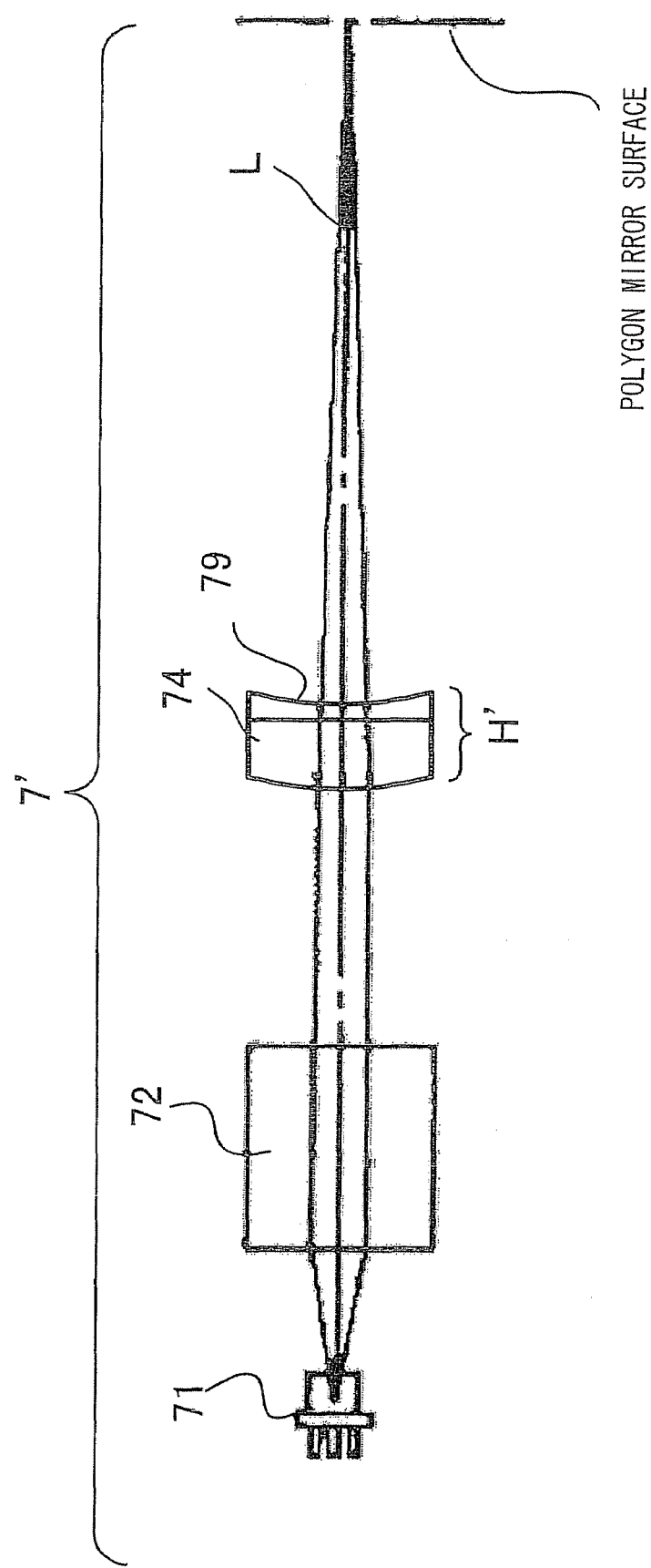
FIG. 31 is a view showing a structure of a pre-deflection optical system 7' in which an optical element 79 is added to a downstream side (outgoing surface side, plane side) of a cylinder lens 74 in a light flux traveling direction.

FIG. 31 is a view showing a structure of a pre-deflection optical system 7' in which an optical element 79 is added to a downstream side (outgoing surface side, plane side) of a cylinder lens 74 in a light flux traveling direction. In the pre-deflection optical system 7' shown in the drawing, the optical element 79 and the cylinder lens 74 are supported to be integrally movable (to enable the adjustment of a position in an optical axis L direction) in a direction (arrow R direction) substantially parallel to the optical axis L of the pre-deflection optical system 7. Besides, in the pre-deflection optical system 7, the optical path is such that the main light beam of the light flux passing through the optical element 79 passes along the optical axis of the optical element 79. In the respective examples, although the structure in which the optical element 79 is added to the upstream side (incident surface side) of the cylinder lens 74 in the light flux traveling direction has been exemplified, it is needless to say that even when the pre-deflection optical system 7' with the hybrid lens H' of the structure shown in the drawing is adopted, the same effect can be obtained.

Incidentally, in the respective examples, although the description has been mainly made on the example having the structure including the two fθ lenses as the common optical element, it is needless to say that the structure as shown in FIG. 22 to FIG. 31 can be applied to an optical system having a structure including one fθ lens as shown in FIG. 4 and FIG. 5.

Incidentally, in the foregoing embodiment, although the structure in which one optical element including a diffraction grating is arranged for an optical path of one light flux has been exemplified, no limitation is made to this, and for example, two optical elements including diffraction gratings are arranged on an optical path, and a diffraction grating having a power in the main scanning direction and a diffraction grating having a power in the sub-scanning direction are separately formed on the two optical elements, so that the degree of freedom of adjustment by the diffraction gratings can be raised, and this can contribute to the improvement in optical performance.

Figure 32:
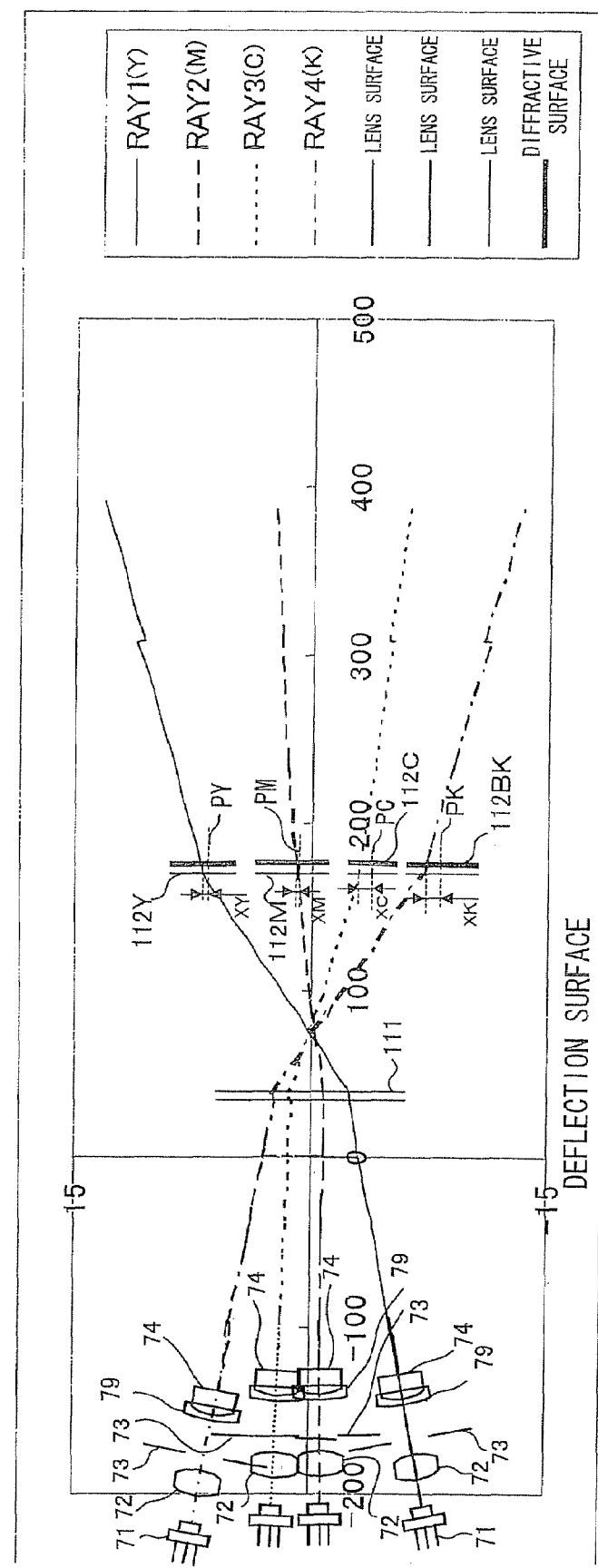
FIG. 32 is a view showing a structure in which fθ2 lenses 112Y to 112BK having diffractive surfaces formed for respective plural light fluxes are provided.

Besides, in the foregoing respective examples, although the example has been described in which the fθ lens in the post-deflection optical system is the common optical element to give the power to all light fluxes to be guided to the plural photosensitive bodies, no limitation is made to this. For example, as shown in FIG. 32, the structure may be made such that fθ2 lenses 112Y to 112BK including diffractive surfaces formed for respective light fluxes are provided, and when the respective light fluxes RAY1 to RAY4 are incident on the fθ2 lenses 112Y to 112BK, the light fluxes RAY1 to RAY4 are incident on positions apart from light axes $P_Y$ to $P_K$ of the fθ2 lenses 112Y to 112BK by distances different from each other ($x_Y \neq x_M \neq x_C \neq x_K$). As stated above, the structure is made such that the fθ lenses are provided individually for the respective plural light fluxes, so that the optical characteristic of each of the light fluxes can be independently adjusted, and it becomes possible to contribute to the further improvement in picture quality.

Figure 33:
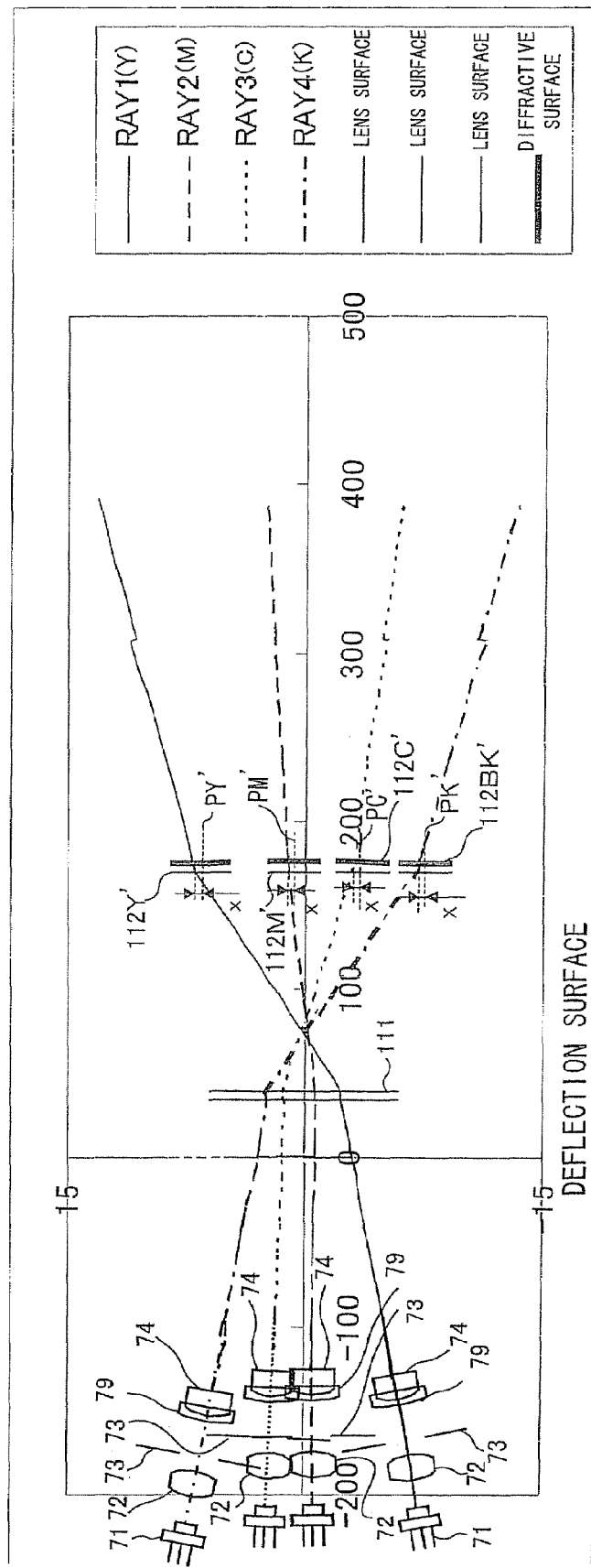
FIG. 33 is a view showing a structure in which fθ2 lenses 112Y' to 112BK' having diffractive surfaces formed for respective plural light fluxes are provided.

In addition to this, as shown in FIG. 33, the structure may be made such that fθ2 lenses 112Y' to 112BK' including diffractive surfaces with different power distributions are provided for respective light fluxes, and when the respective light fluxes RAY1 to RAY4 are incident on the fθ2 lenses 112Y' to 112BK', the respective light fluxes RAY1 to RAY4 are incident on positions apart from optical axes $P_Y'$ to $P_K'$ of the fθ2 lenses 112Y' to 112BK' by distances x equal to each other.

Besides, also in a scanning optical system in which four optical units are individually arranged for respective plural light beams, when the light beam is guided along the same optical path as the optical path shown in the example, the same effect as the embodiment can be obtained.

Besides, in the optical beam scanning device of the respective examples, the polygon mirror 80 is provided with reflecting surfaces with different inclined angles which are arranged correspondingly to the plural photosensitive bodies 401y to 401k in the rotation direction, and the incident light flux is reflected and deflected by the reflecting surfaces, so that the incident light flux can also be scanned in the main scanning direction. In this case, the inclined angle of each of the reflecting surfaces of the polygon mirror 80 with respect to the rotation axis of the polygon mirror 80 is set to an angle corresponding to the photosensitive body to which each reflecting surface is made to correspond.

Further, also in an optical system unit in which two light beams are guided from different directions to two surfaces of one polygon mirror different from each other in angle position, and the reflected lights reflected by the deflection surfaces on which these light beams are incident are scanned in different directions, when the structure of the optical system to guide each of the light beams is the same as the structure described in the example, the same effect can be obtained.

Although the invention has been described in detail while using the specific mode, it would be apparent for one of ordinary skill in the art that various modifications and improvements can be made without departing from the sprit and scope of the invention.

As described above in detail, according to the invention, in the optical beam scanning device, it is possible to provide the technique in which the optical characteristics can be suitably corrected according to the change in environmental temperature.

What is claimed is:

1. An optical beam scanning device configured to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of each of a plurality of photosensitive bodies by a post-deflection optical system, wherein
   the pre-deflection optical system includes a first optical element which is an optical element having a negative power and in which a main light beam of the light flux guided in the pre-deflection optical system passes along an optical axis of the optical element, and
   the post-deflection optical system includes at least one second optical element which is an optical element including a diffraction grating formed on at least one of a light flux incident surface and a light flux outgoing surface and in which main light beams of light fluxes to be guided to the respective plurality of photosensitive bodies are incident on incident positions different from each other in a sub-scanning direction orthogonal to the main scanning direction.

2. The optical beam scanning device according to claim 1, wherein the diffraction grating formed on the second optical element has a power in at least one of the main scanning direction and the sub-scanning direction.

3. The optical beam scanning device according to claim 1, wherein the first optical element and the diffraction grating formed on the second optical element have powers in at least a same direction.

4. The optical beam scanning device according to claim 1, wherein the post-deflection optical system includes a plate-like optical element which is the second optical element including the diffraction grating formed on at least one of the light flux incident surface and the light flux outgoing surface.

5. The optical beam scanning device according to claim 1, wherein
   the pre-deflection optical system shapes each of divergent lights from a plurality of light sources into the light flux having the specified sectional shape and guides it to the rotation deflector, and
   the first optical element is provided individually for each of the light fluxes guided from the plurality of light sources.

6. The optical beam scanning device according to claim 1, wherein the first optical element is provided to be movable in an optical axis direction of the first optical element.

7. The optical beam scanning device according to claim 1, wherein the first optical element and the second optical element are made of a same material.

8. An optical beam scanning device configured to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of a photosensitive body by a post-deflection optical system, wherein
the pre-deflection optical system includes a first optical element which is an optical element having a negative power and in which a main light beam of the light flux guided in the pre-deflection optical system passes along an optical axis of the optical element, and
the post-deflection optical system includes at least one second optical element which is an optical element including a diffraction grating formed on at least one of a light flux incident surface and a light flux outgoing surface and in which the main light beam of the light flux from the pre-deflection optical system is incident on an incident position different from an optical path of an optical axis of the post-deflection optical system in a sub-scanning direction orthogonal to the main scanning direction.

9. The optical beam scanning device according to claim 8, wherein the diffraction grating formed on the second optical element has a power in at least one of the main scanning direction and the sub-scanning direction.

10. The optical beam scanning device according to claim 8, wherein the first optical element and the diffraction grating formed on the second optical element have powers in at least a same direction.

11. The optical beam scanning device according to claim 8, wherein the post-deflection optical system includes a plate-like optical element which is the second optical element including the diffraction grating formed on at least one of the light flux incident surface and the light flux outgoing surface.

12. The optical beam scanning device according to claim 8, wherein
the pre-deflection optical system shapes each of divergent lights from a plurality of light sources into the light flux having the specified sectional shape by the pre-deflection optical system and guides it to the rotation deflector, and
the first optical element is provided for each of the light fluxes guided from the plurality of light sources.

13. The optical beam scanning device according to claim 8, wherein the first optical element is provided to be movable in an optical axis direction of the first optical element.

14. The optical beam scanning device according to claim 8, wherein the first optical element and the second optical element are made of a same material.

15. An optical beam scanning method to shape a divergent light from a light source into a light flux having a specified sectional shape by a pre-deflection optical system and to guide the light flux, which is shaped by the pre-deflection optical system and is deflected and scanned in a main scanning direction by a rotation deflector, to a photosensitive surface of each of a plurality of photosensitive bodies by a post-deflection optical system, wherein
the light flux is guided in the pre-deflection optical system by a first optical element which is an optical element having a negative power and in which a main light beam of the light flux guided in the pre-deflection optical system passes along an optical axis of the optical element, and
the light flux is guided in the post-deflection optical system by at least one second optical element which is an optical element including a diffraction grating formed on at least one of a light flux incident surface and a light flux outgoing surface and in which main light beams of light fluxes to be guided to the respective plurality of photosensitive bodies are incident on incident positions different from each other in a sub-scanning direction orthogonal to the main scanning direction.

16. The optical beam scanning method according to claim 15, wherein the diffraction grating formed on the second optical element has a power in at least one of the main scanning direction and the sub-scanning direction.

17. The optical beam scanning method according to claim 15, wherein the first optical element and the diffraction grating formed on the second optical element have powers in at least a same direction.

18. The optical beam scanning method according to claim 15, wherein the post-deflection optical system includes a plate-like optical element which is the second optical element including the diffraction grating formed on at least one of the light flux incident surface and the light flux outgoing surface.

19. The optical beam scanning method according to claim 15, wherein
the pre-deflection optical system shapes each of divergent lights from a plurality of light sources into the light flux having the specified sectional shape and guides it to the rotation deflector, and
the first optical element is provided individually for each of the light fluxes guided from the plurality of light sources.

20. The optical beam scanning method according to claim 15, wherein the first optical element is provided to be movable in an optical axis direction of the first optical element.

* * * * *